United States Patent
Kancherla et al.

(10) Patent No.: US 10,212,071 B2
(45) Date of Patent: Feb. 19, 2019

(54) BYPASSING A LOAD BALANCER IN A RETURN PATH OF NETWORK TRAFFIC

(71) Applicant: Nicira, Inc., Palo Alto, CA (US)

(72) Inventors: Mani Kancherla, Cupertino, CA (US); Jayant Jain, Cupertino, CA (US); Anirban Sengupta, Saratoga, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 15/387,572

(22) Filed: Dec. 21, 2016

(65) Prior Publication Data

US 2018/0176124 A1  Jun. 21, 2018

(51) Int. Cl.
*H04L 12/707* (2013.01)
*H04L 12/721* (2013.01)
*H04L 29/08* (2006.01)
*H04L 29/06* (2006.01)
*H04L 12/851* (2013.01)

(52) U.S. Cl.
CPC .............. *H04L 45/22* (2013.01); *H04L 45/34* (2013.01); *H04L 45/38* (2013.01); *H04L 47/2483* (2013.01); *H04L 67/1038* (2013.01); *H04L 69/22* (2013.01)

(58) Field of Classification Search
CPC ..... H04L 45/22; H04L 45/34; H04L 67/1038; H04L 45/38; H04L 69/22; H04L 47/2483
See application file for complete search history.

(56) References Cited

U.S. PATENT DOCUMENTS

| 5,504,921 A | 4/1996 | Dev et al. |
| 5,550,816 A | 8/1996 | Hardwick et al. |
| 5,751,967 A | 5/1998 | Raab et al. |
| 6,006,275 A | 12/1999 | Picazo, Jr. et al. |

(Continued)

FOREIGN PATENT DOCUMENTS

| EP | 1653688 A1 | 5/2006 |
| JP | 2003069609 A | 3/2003 |

(Continued)

OTHER PUBLICATIONS

Casado, Martin, et al., "Virtualizing the Network Forwarding Plane", Dec. 2010, 6 pages.

(Continued)

*Primary Examiner* — Candal Elpenord
*Assistant Examiner* — Moo Jeong
(74) *Attorney, Agent, or Firm* — Adeli LLP

(57) ABSTRACT

Some embodiments provide a method that allows a first data compute node (DCN) to forward outgoing traffic to a second DCN directly in spite of receiving the incoming traffic from the second DCN through a load balancer. That is, the return traffic's network path from the first DCN to the second DCN bypasses the load balancer, even though a request that initiated the return traffic is received through the load balancer. The method receives a first data message from a load balancer to be sent to a DCN. After identifying a particular address embedded in the data message by the load balancer, the method generates a table entry, based on source and destination addresses of the data message and the identified address. This entry is used for modifying a source address of a subsequent data message received from the DCN in response to the data message.

17 Claims, 13 Drawing Sheets

(56) References Cited

U.S. PATENT DOCUMENTS

| | | |
|---|---|---|
| 6,104,699 A | 8/2000 | Holender et al. |
| 6,219,699 B1 | 4/2001 | McCloghrie et al. |
| 6,359,909 B1 | 3/2002 | Ito et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,680,934 B1 | 1/2004 | Cain |
| 6,785,843 B1 | 8/2004 | McRae et al. |
| 6,941,487 B1 | 9/2005 | Balakrishnan et al. |
| 6,950,428 B1 | 9/2005 | Horst et al. |
| 6,963,585 B1 | 11/2005 | Pennec et al. |
| 6,999,454 B1 | 2/2006 | Crump |
| 7,046,630 B2 | 5/2006 | Abe et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,260,648 B2 | 8/2007 | Tingley et al. |
| 7,283,473 B2 | 10/2007 | Arndt et al. |
| 7,342,916 B2 | 3/2008 | Das et al. |
| 7,391,771 B2 | 6/2008 | Orava et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,411 B2 | 1/2009 | Weinstein et al. |
| 7,555,002 B2 | 6/2009 | Arndt et al. |
| 7,606,260 B2 | 10/2009 | Oguchi et al. |
| 7,643,488 B2 | 1/2010 | Khanna et al. |
| 7,649,851 B2 | 1/2010 | Takashige et al. |
| 7,710,874 B2 | 5/2010 | Balakrishnan et al. |
| 7,764,599 B2 | 7/2010 | Doi et al. |
| 7,792,987 B1 | 9/2010 | Vohra et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,194,674 B1 | 6/2012 | Pagel et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,239,572 B1 | 8/2012 | Brandwine et al. |
| 8,259,571 B1 | 9/2012 | Raphel et al. |
| 8,265,075 B2 | 9/2012 | Pandey |
| 8,281,067 B2 | 10/2012 | Stolowitz |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,650 B2 | 1/2013 | Foxworthy et al. |
| 8,351,418 B2 | 1/2013 | Zhao et al. |
| 8,370,834 B2 | 2/2013 | Edwards et al. |
| 8,456,984 B2 | 6/2013 | Ranganathan et al. |
| 8,504,718 B2 | 8/2013 | Wang et al. |
| 8,565,108 B1 | 10/2013 | Marshall et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,627,313 B2 | 1/2014 | Edwards et al. |
| 8,644,188 B1 | 2/2014 | Brandwine et al. |
| 8,660,129 B1 | 2/2014 | Brendel et al. |
| 8,705,513 B2 | 4/2014 | Merwe et al. |
| 8,958,298 B2 | 2/2015 | Zhang et al. |
| 9,059,999 B2 | 6/2015 | Koponen et al. |
| 2001/0043614 A1 | 11/2001 | Viswanadham et al. |
| 2002/0093952 A1 | 7/2002 | Gonda |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2003/0225857 A1 | 12/2003 | Flynn et al. |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0120160 A1 | 6/2005 | Plouffe et al. |
| 2005/0132044 A1 | 6/2005 | Guingo et al. |
| 2006/0002370 A1 | 1/2006 | Rabie et al. |
| 2006/0018253 A1 | 1/2006 | Windisch et al. |
| 2006/0026225 A1 | 2/2006 | Canali |
| 2006/0029056 A1 | 2/2006 | Perera et al. |
| 2006/0056412 A1 | 3/2006 | Page |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0291388 A1 | 12/2006 | Amdahl et al. |
| 2007/0043860 A1 | 2/2007 | Pabari |
| 2007/0064673 A1 | 3/2007 | Bhandaru et al. |
| 2007/0140128 A1 | 6/2007 | Klinker et al. |
| 2007/0156919 A1 | 7/2007 | Potti et al. |
| 2007/0201357 A1 | 8/2007 | Smethurst et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0013474 A1 | 1/2008 | Nagarajan et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0151893 A1 | 6/2008 | Nordmark et al. |
| 2008/0159301 A1 | 7/2008 | Heer |
| 2008/0189769 A1 | 8/2008 | Casado et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |
| 2008/0291910 A1 | 11/2008 | Tadimeti et al. |
| 2009/0031041 A1 | 1/2009 | Clemmensen |
| 2009/0043823 A1 | 2/2009 | Iftode et al. |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0150527 A1 | 6/2009 | Tripathi et al. |
| 2009/0161547 A1 | 6/2009 | Riddle et al. |
| 2009/0249470 A1 | 10/2009 | Litvin et al. |
| 2009/0249473 A1 | 10/2009 | Cohn |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046531 A1 | 2/2010 | Louati et al. |
| 2010/0107162 A1 | 4/2010 | Edwards et al. |
| 2010/0115101 A1 | 5/2010 | Lain et al. |
| 2010/0131636 A1 | 5/2010 | Suri et al. |
| 2010/0153554 A1 | 6/2010 | Anschutz et al. |
| 2010/0153701 A1 | 6/2010 | Shenoy et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0175125 A1 | 7/2010 | McDysan |
| 2010/0192225 A1 | 7/2010 | Ma et al. |
| 2010/0205479 A1 | 8/2010 | Akutsu et al. |

(56) References Cited

U.S. PATENT DOCUMENTS

| | | |
|---|---|---|
| 2010/0214949 A1 | 8/2010 | Smith et al. |
| 2010/0275199 A1 | 10/2010 | Smith et al. |
| 2010/0290485 A1 | 11/2010 | Martini et al. |
| 2010/0318609 A1 | 12/2010 | Lahiri et al. |
| 2010/0322255 A1 | 12/2010 | Hao et al. |
| 2011/0016215 A1 | 1/2011 | Wang |
| 2011/0022695 A1 | 1/2011 | Dalal et al. |
| 2011/0026537 A1 | 2/2011 | Kolhi et al. |
| 2011/0032830 A1 | 2/2011 | Merwe et al. |
| 2011/0075664 A1 | 3/2011 | Lambeth et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0119748 A1 | 5/2011 | Edwards et al. |
| 2011/0134931 A1 | 6/2011 | Merwe et al. |
| 2011/0142053 A1 | 6/2011 | Merwe et al. |
| 2011/0145390 A1 * | 6/2011 | Kakadia .......... G06F 9/505 709/224 |
| 2011/0194567 A1 | 8/2011 | Shen |
| 2011/0261825 A1 | 10/2011 | Ichino |
| 2011/0283017 A1 | 11/2011 | Alkhatib et al. |
| 2011/0299534 A1 | 12/2011 | Koganti et al. |
| 2011/0310899 A1 | 12/2011 | Alkhatib et al. |
| 2011/0317703 A1 | 12/2011 | Dunbar et al. |
| 2012/0014386 A1 | 1/2012 | Xiong et al. |
| 2012/0014387 A1 | 1/2012 | Dunbar et al. |
| 2012/0039338 A1 * | 2/2012 | Morimoto .......... H04L 47/125 370/392 |
| 2012/0131643 A1 | 5/2012 | Cheriton |
| 2012/0173757 A1 | 7/2012 | Sanden |
| 2012/0182992 A1 | 7/2012 | Cowart et al. |
| 2012/0236734 A1 | 9/2012 | Sampath et al. |
| 2012/0278802 A1 | 11/2012 | Nilakantan et al. |
| 2013/0007740 A1 | 1/2013 | Kikuchi et al. |
| 2013/0044636 A1 | 2/2013 | Koponen et al. |
| 2013/0044641 A1 | 2/2013 | Koponen et al. |
| 2013/0058346 A1 | 3/2013 | Sridharan et al. |
| 2013/0142048 A1 | 6/2013 | Gross et al. |
| 2013/0145002 A1 | 6/2013 | Kannan et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0266015 A1 | 10/2013 | Qu et al. |
| 2013/0266019 A1 | 10/2013 | Qu et al. |
| 2013/0268799 A1 | 10/2013 | Mestery et al. |
| 2013/0329548 A1 | 12/2013 | Nakil et al. |
| 2013/0339544 A1 | 12/2013 | Mithyantha |
| 2014/0003434 A1 | 1/2014 | Assarpour et al. |
| 2014/0016501 A1 | 1/2014 | Kamath et al. |
| 2014/0195666 A1 | 7/2014 | Dumitriu et al. |
| 2015/0103838 A1 | 4/2015 | Zhang et al. |
| 2018/0063231 A1 * | 3/2018 | Park ............ H04L 67/1004 |
| 2018/0176307 A1 | 6/2018 | Kancherla et al. |

FOREIGN PATENT DOCUMENTS

| | | |
|---|---|---|
| JP | 2003124976 A | 4/2003 |
| JP | 2003318949 A | 11/2003 |
| WO | 2005112390 A1 | 11/2005 |
| WO | 2008095010 A1 | 8/2008 |

OTHER PUBLICATIONS

Wang, Anjing, et al., "Network Virtualization: Technologies, Perspectives, and Frontiers," Journal of Lightwave Technology, Feb. 15, 2013, 15 pages, IEEE.

* cited by examiner

BYPASSING A LOAD BALANCER IN A RETURN PATH OF NETWORK TRAFFIC

BACKGROUND

In networking, load balancers are traditionally used to distribute network and application traffic across a number of servers. In some networks, however, load balancers create a bottleneck in the path of the network traffic since both incoming and outgoing traffic have to pass through the load balancers. For example, in hosting systems, such as datacenters, where the north-south traffic is often asymmetric (i.e., the network traffic that leaves a hosting system is substantially more than the traffic that enters it), load balancers can cause significant disruption and inefficiency in network throughput. To get around this bottleneck, traditional load balancer vendors have used a technique called Direct Server Return (DSR) to be implemented by the load balancers, which modifies the traffic flow by permitting the server to respond directly to the client. The direct response to clients relieves the network load balancer of the need to handle the heavy return traffic.

DSR solutions, however, require special configuration on servers to process the outgoing traffic differently (in order to bypass the load balancer). For example, an L2 DSR solution requires defining specific loopback port addresses on the servers while an L3 DSR requires installing particular modules (e.g., kernel modules) on the servers for modifying the reverse flows. Additionally, the return traffic is invisible to a load balancer that employs a DSR technique (L2 or L3 DSR), a network connection (e.g., a TCP connection between a client and the load balancer) cannot be terminated at the load balancer. As such, a traditional DSR load balancer either cannot process higher network layer protocols (e.g., transport layer or application layer protocols), or if it can, the load balancer can cause serious security risks for the network (e.g., malicious network attacks such as DDoS attacks).

BRIEF SUMMARY

Some embodiments provide a method that allows a first data compute node (DCN) to forward outgoing traffic to a second DCN directly in spite of receiving the incoming traffic from the second DCN through a load balancer. That is, the return traffic's network path from the first DCN (e.g., a server machine) to the second DCN (e.g., a client machine) bypasses the load balancer, even though a request that initiated the return traffic is received through the load balancer. The method of some embodiments does not require any changes in the configuration of the first DCN (e.g., the server) in order to bypass the load balancer. That is, even though the return traffic has to be modified to reach a client machine directly, the configuration of a server machine that initiates the return traffic does not have to be changed to make such a modification in the return traffic.

The method of some embodiments is implemented by a module that executes in a virtualization software (e.g., a hypervisor) of a host machine that hosts one or more DCNs (e.g., virtual servers). Each load balancing (LB) module, in some embodiments, executes on a host machine (e.g., of a hosting system) and intercepts the network traffic destined for and/or received from one or more DCNs that execute on the same host machine. Even though an LB module is described hereinafter, in some embodiments the method is implemented by a DCN (e.g., a virtual machine (VM), a container, a namespace, etc.) that runs on top of a virtualization software of a host machine that hosts the server machines. In yet other embodiments, the method is implemented by a module executing in the virtualization software together with a DCN that executes on top of the virtualization software.

The load balancer of some embodiments receives one or more data messages (e.g., from a client machine requesting for data) and performs a load balancing algorithm (e.g., round robin, etc.) to identify a candidate server machine for responding to the data message. In some such embodiments, the load balancer inserts a source address for the reverse flow (i.e., return network traffic generated in response to the request) into the data message before forwarding the data message towards the identified server. The inserted reverse source address in some embodiments is one of a set of virtual internet protocol (VIP) addresses that the load balancer advertises for providing data from a set of servers (e.g., a set of web servers that implement a web application). In some embodiments, the load balancer inserts the reverse source address into a particular header field of a data message (e.g., in the differentiated services code point (DSCP) header) before forwarding the data message towards a server.

In some embodiments, the load balancer generates a particular value that is associated with each reverse source address and inserts the generated value into the data message (instead of a physical address). In order to forward the data message towards the identified server, the load balancer performs a destination network address translation (DNAT) on the received data message to replace the destination address with the identified server's address and then forwards the data message towards the destination server. In some embodiments, a load balancing module that runs in a host machine along with the selected server machine intercepts the data message on its way towards the server.

The LB module generates a reverse data flow entry (e.g., based on the five-tuple of the packet) and associates the generated entry with the reverse source address retrieved from the particular header field of the data message (i.e., the inserted VIP address). In some embodiments, in addition to the reverse flow entry, the LB module generates a forward flow entry for the data message as well and associates this entry with the reverse flow entry and the VIP address. In some embodiments, the LB module generates these flow entries only for a first data massage that is received from a DCN. Any subsequent data message from the DCN simply passes through the LB module. The LB module stores the generated entries as well as the associated VIP in a corresponding data storage (e.g., a local data flow storage on the host machine in some embodiments).

When the server machine processes the data message received from the LB module and sends out the return traffic in response to the data message, the LB module catches the return traffic before this traffic leaves the host machine. The LB module then looks up the data flow storage to find a corresponding reverse source address for the return traffic. When a match is found, the LB module performs a source network address translation (SNAT) on the return traffic in order to replace the source addresses of the data messages (i.e., the server's address) with the associated reverse source address found in the data flow table. This way, when the client machine (i.e., the originator of the initial data message) receives the return traffic, the client machine thinks that the return traffic is received from the same VIP address to which the initial data message was sent.

In other words, the return traffic bypasses the load balancer while the requesting DCN thinks that the traffic is received from the load balancer. As stated above, the LB module of some embodiments redirects the return traffic without making any changes in the configuration of the server machine that generates the return traffic. That is, by employing the LB module, a need for configuring particular loopback addresses and/or installing particular modules in the server machines is eliminated. Since some embodiments insert an associated value (instead of real physical address) as the reverse source address in the data messages, the LB module of some such embodiments needs a mapping table (e.g., stored in a local data storage) in order to map the inserted value to its corresponding VIP address.

The above-described method is a distributed stateful hypervisor return (DSHR) option that is employed by some embodiments for bypassing a load balancer for layer two and layer three network traffic (also referred to as L2/L3 DSHR). That is, when a load balancer is coupled to the same layer two forwarding element (e.g., a physical or logical L2 switch) to which the server machines are coupled, this method is employed to bypass the load balancer. Additionally, when a load balancer is coupled to a forwarding element that is one or more hops away from the servers, the method can be employed to bypass the load balancer.

In some embodiments, a load balancer can determine whether the data messages are sent to DCNs that are on the same L2 Switch as the load balancer or the data messages should be sent to DCNs that are one or more hops away. Based on such a determination, the load balancer of some embodiments is able to determine whether the load balancer should perform an L2/L3 DSHR or a higher level DSHR should be performed.

In L2/L3 DSHR, because the load balancer does not have any visibility on the return traffic, the load balancer cannot maintain a state of a higher network layer connection between the two DCNs that exchange the data. As such, in order to be able to provide many additional services that are provided by a layer four or layer seven load balancer (e.g., URL-based or cookie-based server selection, content manipulation or inspection, malicious attack protection, etc.), some embodiments perform L4/L7 DSHR to preserve a connection state at the LB module (also referred to as a DSHR module) instead of the load balancer.

Some embodiments transfer a network connection established at a load balancer to a DSHR module that operates on the same host machine as a selected DCN (i.e., the DCN identified to receive the network traffic from the load balancer). In other words, in some embodiments, the server and client machines establish a direct connection session (e.g., a TCP connection session), through which the server machine receives the forward flow from a load balancer, but forwards the reverse flow directly to the client machine. In order to do so, the load balancer of some embodiments establishes a connection session with a client machine when it receives a connection request from the client machine.

In other words, instead of simply passing a connection request through to a server machine, the load balancer establishes the connection with the client machine upon receiving the connection request. This way, the legitimacy of the client machine can be confirmed by the load balancer as well (since the request, which can be a malicious request and not from a legitimate user, is not forwarded directly to other network entities).

For example, when a load balancer receives a connection request that requires a multi-step handshake for the connection to be established (e.g., a three-way handshake to establish a TCP connection), the load balancer performs the multi-step handshake. That is, instead of selecting a server and passing the request to the selected server, the load balancer performs the handshake itself.

In some embodiments, after establishing the connection and receiving a set of necessary connection parameters (e.g., sequence number, time stamp, window size, negotiated options, etc., for a TCP connection), the load balancer passes these connection parameters over to the DHSR module. The load balancer adds this data (i.e., necessary connection parameters) to a tunnel header of the data message before tunneling the data message to the DSHR module in some embodiments. In some other embodiments, the load balancer inserts the connection parameters into one or more specific header fields of the data message (e.g., in one or more header fields of a TCP SYN packet).

Upon receiving the specially constructed connection request from the load balancer, the DSHR module generates new forward and reverse flow entries for the connection (in the same way as described above for L2/L3 DSHR). The DSHR module also extracts the connection information embedded in the data message and stores this information along with the generated flow entries. In some embodiments, the DSHR module removes the inserted connection parameters from the data message before passing it to the server. The DSHR module of some embodiments then handles any necessary multi-step handshake with the server directly.

That is, when the DSHR module receives an acknowledgement from the server, instead of passing the acknowledgment to the client machine, the DSHR module responds to the server itself. For example, when the server responds with a TCP SYN-ACK to a TCP SYN received from the client machine through the DSHR module, the DSHR module intercepts the SYN-ACK packet and responds back to the server with a TCP-ACK to complete a 3-way handshake with the server directly.

For the remaining data messages in the forward flow (i.e., traffic from client to server), the load balancer only performs a DNAT (to replace destination address with the selected server's address) and sends the traffic out to the server. This traffic is then intercepted by the DSHR module (e.g., operating on the same host machine as the server) to adjust the necessary connection variables (e.g., sequence numbers, TCP selective acknowledgement (SACK) options, timestamp values, etc.) before sending the traffic over to the server. All of the data messages in the reverse flow (i.e., from server to client) are also intercepted by the DSHR module to perform similar adjustments on the connection parameters before sending the return traffic directly to the client.

While some higher layer load balancing features (e.g., data compression, deep packet inspection, etc.) can be implemented with the above-described L4/L7 DSHR module, for some other higher layer features (e.g., cookie persistence, multiple HTTP requests within a single TCP connection, etc.) the DSHR module of some embodiments takes one or more additional steps. For example, when there are multiple requests (e.g., HTTP requests) within the same connection session (e.g., a TCP connection session), each DSHR module that receives an HTTP connection request has to send an acknowledgment back to the load balancer as soon as the requested traffic is sent out.

Upon receiving this acknowledgment from a server, the load balancer can send another queued HTTP request (if any) to a second server. Therefore, each time the load balancer of some embodiments receives a new HTTP request, it checks to see if it has received an acknowledgement back from a previous connection with a server. In some embodiments, the load balancer places the request in a queue if the previous server has an active HTTP connection with the client (i.e., no acknowledgment has been received from the server yet). Otherwise, when there is no active HTTP session, the load balancer simply passes the request to the next selected server (e.g., based on the content of the request).

In some embodiments, the load balancer has to terminate the last TCP connection with the client first and then look inside the received HTTP request before the load balancer selects the next server. In other words, the load balancer reads the complete request coming from the client and uses the content of the data messages to select a specific server. The load balancer then hands over the connection state and the data to the LB module to be presented to the server. Once the server is done responding directly to the client, the LB module can hand over the state connection to the load balancer for the next HTTP request.

Therefore, unlike an L4 DSHR, in which a multi-step handshake is required (i.e., no content inspection is required), an L7 DSHR may require proper stack processing such as acknowledging and buffering data, handling retransmissions, etc. As such, the connection parameters that need to be transferred under L7 DSHR could be substantially more than a simple connection state transfer under L4 DSHR.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

Figure 1:
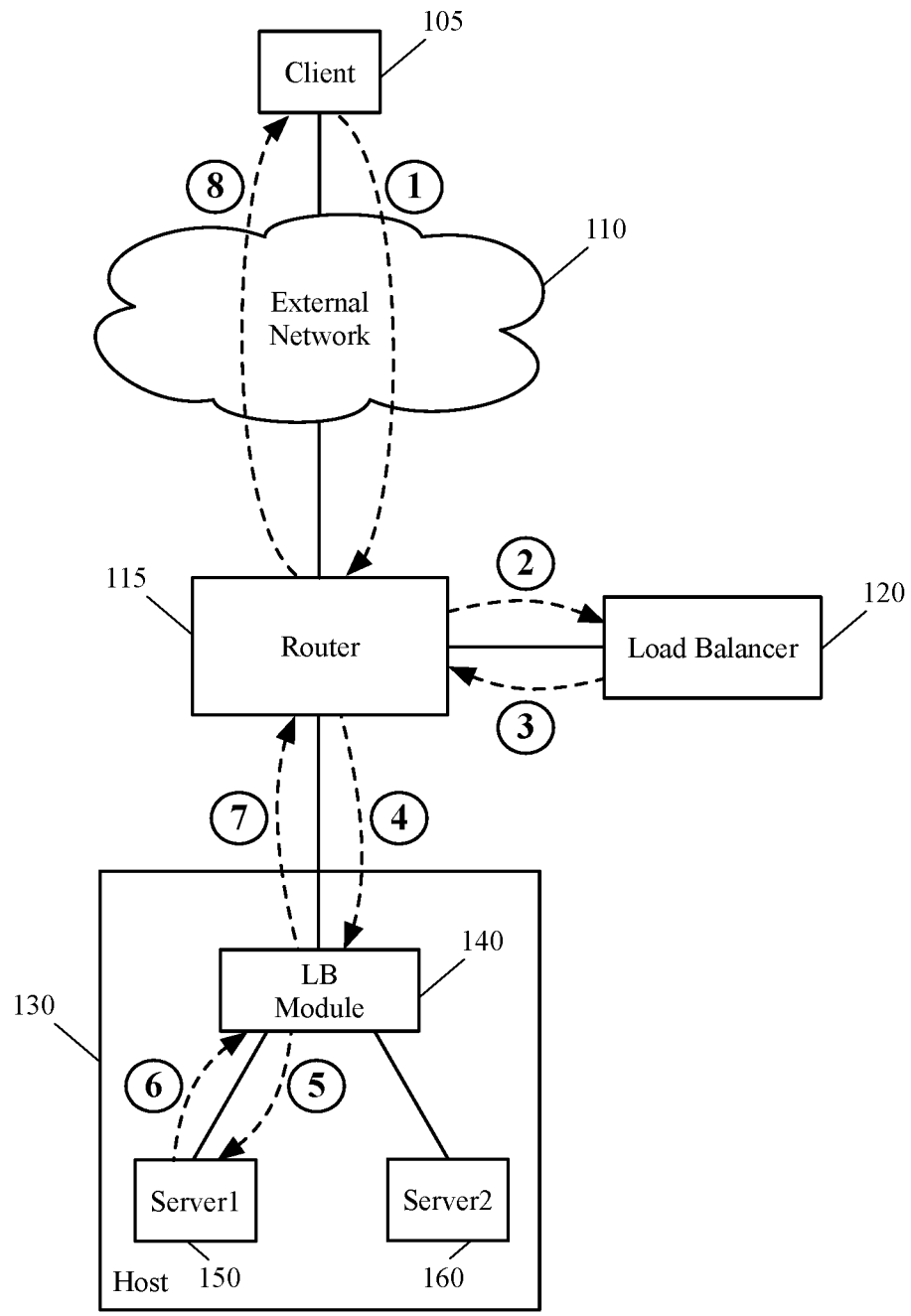
FIG. 1 illustrates an example path of network traffic exchanged between a client machine and a server machine in which a load balancer is bypassed in the return traffic path.

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a method that allows a first data compute node (DCN) to forward outgoing traffic directly to a second DCN in spite of receiving the incoming traffic from the second DCN through a load balancer. That is, the return traffic's network path from the first DCN (e.g., a server machine) to the second DCN (e.g., a client machine) bypasses the load balancer, even though a request that initiated the return traffic is received through the load balancer. The method of some embodiments does not require any changes in the configuration of the first DCN (e.g., the server) in order to bypass the load balancer. That is, even though the return traffic has to be modified to reach a client machine directly, the configuration of a server machine that initiates the return traffic does not have to be changed to make such a modification in the return traffic.

The method of some embodiments is implemented by a module that executes in a virtualization software (e.g., a hypervisor) of a host machine that hosts one or more DCNs (e.g., virtual servers). Each load balancing (LB) module, in some embodiments, executes on a host machine (e.g., of a hosting system) and intercepts the network traffic destined for and/or received from one or more DCNs that execute on the same host machine. Even though an LB module is described hereinafter, in some embodiments the method is implemented by a DCN (e.g., a virtual machine (VM), a container, a namespace, etc.) that runs on top of a virtualization software of a host machine that hosts the server machines. In yet other embodiments, the method is implemented by a module executing in the virtualization software together with a DCN that executes on top of the virtualization software.

The load balancer of some embodiments receives one or more data messages (e.g., from a client machine requesting for data) and performs a load balancing algorithm (e.g., round robin, etc.) to identify a candidate server machine for responding to the data message. In some such embodiments, the load balancer inserts a source address for the reverse flow (i.e., return network traffic generated in response to the request) into the data message before forwarding the data message towards the identified server. The inserted reverse source address in some embodiments is one of a set of virtual internet protocol (VIP) addresses that the load balancer advertises for providing data from a set of servers (e.g., a set of web servers that implement a web application). In some embodiments, the load balancer inserts the reverse source address into a particular header field of a data message (e.g., in the differentiated services code point (DSCP) header) before forwarding the data message towards a server.

FIG. 1 illustrates an example path of network traffic exchanged between a client machine and a server machine in which a load balancer is bypassed in the return traffic path. Specifically, this figure shows the path of network traffic from a client to a server passing through a load balancer, while the return path of the network traffic from the server to the client does not pass through the load balancer. The figure includes a client machine 105, an external network 110, a router 115, a load balancer 120, and a host machine 130. The host machine 130 includes a load balancing (LB) module 140 and two server machines 150 and 160.

The load balancer 120, router 115, and servers 150-160, as will be described in more detail below by reference to FIG. 2, could be different logical network entities that are part of a logical network implemented on a physical network infrastructure. For example, the logical network may logically connect several different virtual and physical machines of a tenant of a datacenter, or different machines that implement a multi-layer application. Different instances of different layers of the applicant can be instantiated on different servers that are logically connected to each other and to the external network 110 through different logical forwarding elements of the logical network. Additionally, although shown as separate elements, the load balancer 120 can be part of the router 115 (i.e., implemented by this router).

The client machine 105 is connected to the network through the external network 110. The external network 110 can be a network that connects the logical network to other logical networks of the same data center, or a network that connects the logical network to other logical and/or physical networks outside of the hosting system (e.g., the Internet). The host machine 130 can be one of the many host machines of a hosting system on which different machines of one or more logical networks run. Although not shown, the LB module 140 can be a module that operates in the hypervisor of the host machine 130.

The encircled steps 1-5 show a first data message (e.g., a packet) travelling from the client machine 105 to the server machine 150, while the encircled steps 6-8 show the path of a second packet that is sent out from the server 150 to the client 105 (e.g., in response to the first packet). As illustrated, every packet that is received through the external network has to be processed by the router 115. As such, when the router receives a packet from the client machine 105 (encircled 1), the router sends the packet to the load balancer 120 (encircled 2) for the load balancer to decide which server should receive the packet.

The load balancer can be an L4 load balancer that, based on the layer four information inside the packet (e.g., five-tuple of the packet), decides where to send the packet. The load balance can also be a layer 7 load balancer that looks deeper into the content of the packet and based on the content of the packet decides where to send the packet. Either way, after selecting a machine to which the packet should be sent, the load balancer 120 sends the packet back to the router 115 (encircled 3) to be forwarded to the selected server. However, for an L2/L3 DSHR (i.e., for bypassing the load balancer in return traffic), the load balancer has to let the LB module 140 know about the source address for the return traffic. In order to do so, before sending the packet out, the load balancer inserts a reverse source address in the packet.

As an example, the load balancer may advertise a set of Virtual Internet Protocol (VIP) addresses to the outside network for any device that wants to connect to a web application. The web application can be a distributed application the instances of which are implemented by a set of servers of a logical network including the servers 150-160. When the client 105 wants to receive data (e.g., static data, dynamic data, etc.) from the web application, the client 105 sends a request towards the web application by using one of the advertised VIP addresses in the destination address of the packet. This request packet is received by the load balancer 120 (through the external network 110 and router 115). The load balancer performs a load balancing algorithm on the packet and selects server 150 as the best candidate for providing the requested data.

As such, the load balancer performs a DNAT on the packet to replace the destination address of the packet with the address of the server (e.g., the IP and port addresses of the server). But this way, the return traffic will have the address of the server 150 as the source of the traffic which is unknown to the client. Therefore, the load balancer also inserts the VIP address to which the packet was sent (or an associated calculated value) in a particular header field of the packet (e.g., DSCP header of the packet). This way, the return traffic can identify itself as being sent by the same web application to which the client 105 had sent the request.

After the router 115 receives the modified packet, the router sends the packet (encircled 4) to the host machine 130. The packet is intercepted in the hypervisor of the host machine by the LB module 140 before it reaches the server 150. When the module intercepts the packet and realizes that no forward and reverse flow entries are generated for the identification data included in the packet (e.g., the five-tuple of the packet), the LB module generates these flow entries. The LB module also reads the reverse source address (i.e., the inserted VIP address) from the DSCP header of the packet and stores the flow entries and the associated VIP address in a local data storage (e.g., in the hypervisor of the host machine).

After storing this information, the LB module 140 sends the packet to the server 150 (encircled 5). The server module receives the packet and after processing it, sends the requested data as return traffic towards the client 105 (encircled 6). That is, the server assigns the server's address (IP and port addresses) as the source of the return traffic and the client's address as the destination of the traffic. However, before the return traffic leaves the host machine 130, the LB module 140 catches the traffic. The module then matches the reverse traffic addresses against the stored reverse addresses and when a match is found, the LB module performs an SNAT on the traffic to replace the source address with the VIP address associated with the reverse flow entry.

The LB module then sends the return traffic to the router (encircled 7). Since the destination address in the return traffic identifies the client machine 105 as the destination of the traffic, the router 115 forwards the return traffic to the external network 110 to be sent to the client machine 105 (encircled 8). When the client machine receives the traffic, it thinks that the traffic is sent from the same web application to which it had sent the request. As such, any subsequent requests will be sent to the same VIP address to reach the web application. As shown, adding an LB module to the host machine eliminates the need to make any changes in the configurations of the servers 150-160 and no extra steps should be taken by these servers to perform L2/L3 DSHR.

Without such an LB module, each of the (backend) servers should be configured with a virtual IP (VIP) address as a loopback IP address. In addition, all the servers should be configured to not respond to any address resolution protocol (ARP) requests for the loopback IP addresses (i.e., a VIP addresses) because otherwise, each server may steal the requests (coming from the clients) from the load balancer. Therefore, the VIP addresses are only advertised by the load balancer to attract traffic (e.g., from the Internet).

In L2 forwarding, the load balancer then forwards the packets to the backend servers via redirecting the media access control (MAC) address and without performing any DNAT on the packets. The server accepts the traffic as the traffic is destined to its loopback IP address. The return traffic also goes directly from the server to the outside network with the source address being assigned as the loopback address (i.e., VIP address). Without a DSHR module, the configuration of the servers should be modified even more for L3 forwarding. That is, in addition to configuring the loopback addresses on the servers, a kernel module should be installed on each of the backend servers so that it can extract the return source address from the packets because the packets received have the destination address of the server.

In the illustrated example, the path of network traffic is north-south and the client machine is behind the external network while the server machines are running on a host machine (e.g., in a hosting system). Although utilizing a DSHR method for a north-south traffic where the outgoing return traffic can be way heavier than the incoming requests, it should be understood that a DSHR module can be equally utilized by a load balancer on an east-west network path. For example, a DSHR module can be used to receive network traffic from another VM of a hosting system through a load balancer on the east-west traffic and bypass the load balancer when the return traffic is sent to the VM. In other words, the DCNs shown in the illustrated example (i.e., client machine 105 and servers 150-160) do not have to necessarily be on separate networks, nor does the path of traffic have to necessarily be north-south.

Each of the end machines shown in FIG. 1 (i.e., the client and server machines) can be any type of a data compute node (e.g., a virtual machine (VM), a container, etc.). Additionally, the server machines can be physical machines or any other type of DCNs that can be logically connected to logical forwarding elements of a logical network. In some embodiments, these end machines are logically connected to each other and to other end machines of other networks (logical and/or physical networks) through the logical forwarding elements of the logical network.

The logical forwarding elements are implemented by one or more managed forwarding elements (MFEs) that operate (execute) on each host machine in some embodiments. Each MFE typically operates in a virtualization software (e.g., a hypervisor) of a host machine. The logical forwarding elements (LFEs) can also be implemented by one or more managed hardware forwarding elements (e.g., a hardware top of rack (TOR) switch) through physical ports of which a set of physical machines (e.g., physical servers) logically connects to the logical network.

A logical network, in some embodiments, in addition to several different L2 and L3 logical forwarding elements (e.g., logical switches and logical routers), includes other logical network elements (e.g., logical firewall, logical load balancer, etc.) that are placed on different logical paths of the logical network. Through these logical network elements several different DCNs that run on different host machines connect to each other, to other physical machines of the logical network (e.g., physical machines connected to managed hardware forwarding elements such as TOR switches, hardware routers, etc.), and to other end machines of other networks, such as the client machine 105 shown in FIG. 1.

In some embodiments, a user defines a logical network topology (i.e., defines the logical network elements and the connections between these elements) for a logical network through a management and control system of the logical network. The management and control system includes one or more manager machines (or manager applications) and control machines (or applications) through which the different logical network elements are defined (e.g., through API calls, user interfaces) and controlled (e.g., their network communications are controlled).

The management and control system pushes the configuration data of the network to a set of physical nodes (e.g., host machines, gateway machines, etc.) in order to configure the physical nodes to implement the logical network (i.e., to implement the logical network elements of the logical network). The configuration and forwarding data that is distributed to the physical nodes defines common forwarding behaviors of the managed forwarding elements (MFEs) that operate on the physical nodes in order to implement the logical forwarding elements (LFEs).

The configuration data also configures the virtualization software of the physical nodes to implement other logical network elements (e.g., to instantiate a distributed firewall instance on each hypervisor that implements the logical firewall, to instantiate a load balancer module instance on a gateway machine to implement the logical load balancer, etc.). The configuration data also configures the hypervisor to implement a DSHR module that performs distributed stateful hypervisor return. In other words, the management and control system of some embodiments generates and distributes configuration data for implementing a DSHR module to each host machine that executes at least one server machine that may receive load balanced traffic from a load balancer.

In some embodiments, a local controller that operates on each physical node (e.g., in the hypervisor of a host machine) receives the configuration and forwarding data from the management and control system. The local controller then generates customized configuration and forwarding data that, for example, defines specific forwarding behavior of an MFE that operates on the same host machine on which the local controller operates and distributes the customized data to the MFE. The MFE implements the set of logical forwarding elements based on the configuration and forwarding data received from the local controller. Each MFE can be connected to several different DCNs, different subsets of which may belong to different logical networks (e.g., for different tenants). As such, the MFE is capable of implementing different sets of logical forwarding elements for different logical networks.

Figure 2:
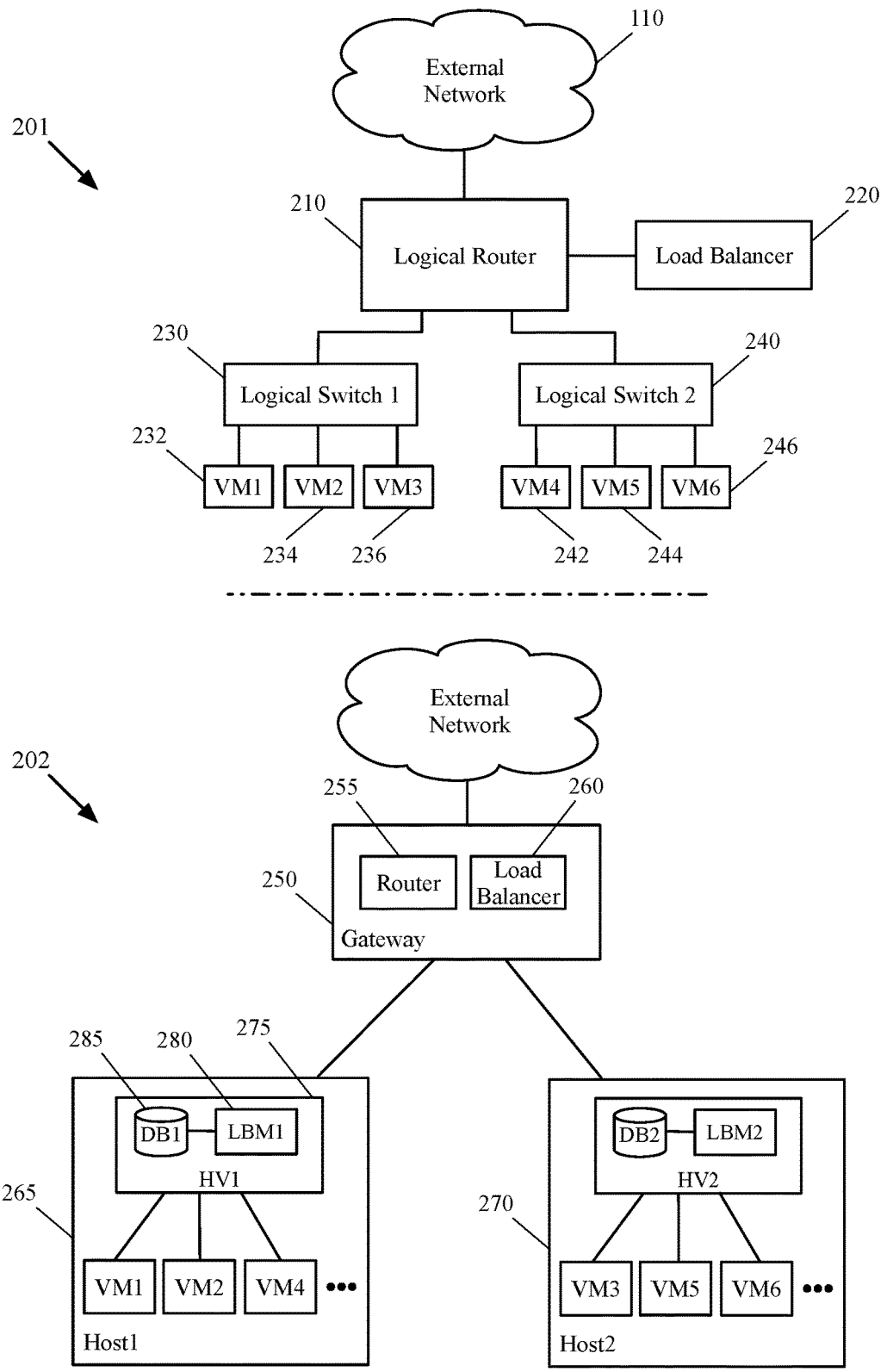
FIG. 2 illustrates a portion of a logical network topology that includes a logical load balancer and a portion of a physical network infrastructure that implements the logical network.

FIG. 2 illustrates a portion of a logical network topology that includes a logical load balancer and a portion of a physical network infrastructure that implements the logical network. More specifically, the top half of the figure illustrates a logical network 201 that includes a logical router 210, a logical load balancer 220, and two logical switches 230 and 240. Logical network is connected to the external network 110 described above by reference to FIG. 1. The logical network 201 can be an overlay network (e.g., defined for a tenant of a datacenter) that is implemented by an underlay physical network (e.g., a physical network of a datacenter).

The logical router 210 connects the logical switches 230 and 240 to each other and to the external network 110. The logical switch 230 logically connects the VMs 232-236 to each other and to the logical network 201, while the logical switch 240 logically connects the VMs 242-246 to each other and to the logical network 201. Through these logical network forwarding elements, the VMs 232-236 and VMs 242-246 communicate with each other, with other end machines of the logical network, and with other end machines in the external network 110. As described above, each of these logical network elements can be defined (e.g., through a set of API calls) by a user (e.g., a datacenter network administrator, a tenant, etc.).

The load balancer 220 is placed on the north-south path of the logical network by coupling to the logical router 210. As such, any inbound network traffic that is passed through the logical router 210 and that can be sent to a set of end machines (e.g., that share a same VIP address) can be routed to one of the end machines based on a decision made by the load balancer 220. The load balancer makes such decisions based on one or more load balancing algorithms (e.g., round robin, weighted round robin, source IP hash, least connections, etc.) that are defined for the load balancer.

For example, when a packet is received from the external network 110 that can be sent to any of the end machines 232-236, the logical router sends the packet to the load balancer 240. After performing the load balancing, the load balancer 240 decides to send the packet to the VM 234. Therefore, the load balancer performs a DNAT and other necessary functions (depending on what type of DSHR is required) and then sends the packet to the router to be routed towards the VM 234.

It should be understood that the number of logical network elements illustrated in the figure is limited in order to simplify the description. Otherwise, a logical network may have many more logical network elements such as additional logical forwarding elements and/or logical middleboxes (e.g., logical firewalls, logical DHCP servers, logical load balancers, etc.). Conversely, a logical network may include a single logical network element (e.g., a logical switch) that logically connects several different machines (physical or virtual) to the logical network. Similarly, the number of demonstrated virtual machines is exemplary. A real logical network may connect hundreds or even thousands of virtual and physical machines together and to other networks.

The bottom half of FIG. 2 illustrates the physical implementation of the logical network elements illustrated in the top half of the figure. More specifically, the bottom half shows how some of the physical nodes of the physical network architecture 202 are configured (e.g., by a management and control system that is not shown) to implement the logical switches, router, and load balancer of the logical network architecture 201 shown in the top half. The physical nodes shown in this figure include a gateway machine 250 and two host machines 265 and 270. The figure also shows that the gateway machine 250 is connected to the external network 110 (e.g., through a physical router that is not shown).

Each of the illustrated physical nodes includes a managed forwarding element (not shown) that operates in the virtualization software 275 of the physical node in some embodiments. The host machine 265 hosts the VMs 232, 234 and 242, along a set of other DCNs, while the host machine 270 hosts the VMs 236, 244 and 246, along a set of other DCNs. Each MFE (executing on a host machine) implements the LFEs of the logical network by performing the forwarding processing of the LFEs for the packets that are received from, or sent to the corresponding VMs that are connected to the MFE.

For example, the first and second logical ports of the logical switch 230 shown in the top half of the figure are mapped to two physical (software) ports of an MFE that executes on the host machine 265. These ports of the MFE are coupled to VMs 232 and 234 (i.e., VM1 and VM2). On the other hand, the third logical port of this logical switch is mapped to a physical port of a second MFE that executes in the host machine 270. This physical port of the second MFE 15 coupled to the virtual machine 236 (VM3). Conversely, a logical port of the logical switch 240 is mapped to a third physical port of the MFE executing in the first host machine Host1 which is coupled to the VM 242 (VM4). Therefore, as shown, each MFE is capable of implementing different logical switches of one or more logical networks.

The virtual machines of each host machine communicate (e.g., exchange network data) with each other, with the virtual machines executing on the other host machines, and with the external network via the MFEs that implement the LFEs of the logical network 201. In some embodiments, the MFEs perform the entire first-hop forwarding processing for the logical switches and routers on packets that are received from the virtual machines. As stated above, the MFEs residing on the host machines Host1-Host2 may also implement logical switches (and distributed logical routers) for other logical networks if the other logical networks have VMs that reside on the host machines Host1-Host2 as well.

In some embodiments, when an MFE executing in one of the host machines Host1-Host2 receives a packet from a VM that is coupled to the MFE, it performs the processing for the logical switch to which that VM is logically coupled, as well as the processing for any additional logical forwarding elements (e.g., processing for logical router 210, if the packet is sent to the external network 110, logical router processing and processing for the other logical switch if the packet is sent to a VM coupled to the other logical switch, etc.).

Additionally, as illustrated in the figure, each hypervisor 275 includes an LB module 280 and a local database 285 for the MB module. The flow entries that the LB module generates and uses are kept in the local database 285. These flow entries and databases are discussed in more detail below by reference to FIGS. 5 and 7. Additionally, the connection state data (e.g., a set of connection parameters and variables) are stored in the local data storages 285 in some embodiments, while in some other embodiments, the connection state data are stored in other data storages (not shown).

In some embodiments, a local controller (not shown) that operates in each hypervisor 275 of the host machines receives the configuration data for the logical network from the management and control system. The received configuration data might be general configuration data that is defined for all of the MFEs or a particular subset of MFEs. The local controller then converts and customizes the received logical network data for the local MFE that operates on the same host machine on which the local controller operates. The local controller then delivers the converted and customized data to the local MFE on each host machine for implementing the logical network(s).

In addition to configuring the MFEs to handle the east-west traffic (e.g., by implementing the logical switches and router), the management and control system generates and distributes configuration data of the forwarding elements to the gateway machine 250 to connect the virtual machines VM1-VM6 to the external network 110. The distributed data also includes configuration data for implementing (1) a load balancing instance 260 that performs the load balancing duties of the logical load balancer 220 and (2) a router (or a component of the router) instance 255 for performing L3 routing on the north-south traffic (exchanged between the logical network 201 and the external network 110).

In some embodiments, an edge node (i.e., gateway machine 250) is a host machine that executes each of the routing and load balancing instances (and other stateful services modules such as firewall modules, NAT modules, etc.) as a DCN (e.g., a VM, a container, etc.). Also, in some embodiments, the load balancer instance 260 is part of (e.g., a module of) the router instance 255 operating on the gateway machine 250. Once instantiated, the load balancer 260 can receive the inbound traffic from the router 255 and decide to which DCN on the network the traffic should be sent.

As an example, when a packet is received through the external network, the packet can be sent to the load balancer 260 to decide to which DCN the packet should be sent. The load balancer then performs all the necessary functions (e.g., DSHR processing) for bypassing the load balancer in the return path. The load balancer then sends the (modified) packet back to the router 255 to forward the packet towards the selected destination. The gateway machine (e.g., an MFE in the machine) then encapsulates the packet with the necessary tunneling information of a tunneling protocol (e.g., VXLAN) and tunnels the encapsulated packet towards the destination DCN (e.g., VM1 in Host1).

When the encapsulated packet is received at the hypervisor of the host machine, not only the hypervisor (e.g., an MFE running in the hypervisor) decapsulates the packet, but before sending the decapsulated packet, the LB module 280 intercepts the packet. The LB module then performs the required DSHR tasks (e.g., generating forward and reverse entries and associating them with a reverse source address if necessary) utilizing the data storage 285. The LB module then lets the packet continue on its path towards its ultimate destination (e.g., VM1). The LB module 280 also intercepts the packets that are sent out by VM1 in response to the packet received from the external network.

One of ordinary skill in the art would realize that the number of the host machines, edge nodes, and virtual machines illustrated in the figure are exemplary and a logical network for a tenant of a hosting system may span a multitude of host machines (and third-party hardware switches), and logically connect a large number of DCNs to each other (and to several other physical devices that are connected to the hardware switches). Additionally, while shown as VMs in this figure and other figures below, it should be understood that other types of data compute nodes (e.g., namespaces, containers, etc.) may connect to logical forwarding elements in some embodiments.

General features of implementation of a logical network that includes a load balancer and performs distributed stateful hypervisor return (DSHR) to bypass the load balancer were described above. In the following, Section I describes the embodiments that are capable of performing L2/L3 DSHR utilizing a distributed DSHR module that operates on a hypervisor of a host machine. Next, Section II describes the embodiments that are capable of performing L4/L7 DSHR in order to utilize all the features and services that an L4 and/or L7 load balancer provides. Finally, Section III describes the electronic system with which some embodiments of the invention are implemented.

I. L2/L3 DSHR

In order to perform L2 and/or L3 distributed stateful hypervisor return (DSHR), when a load balancer receives a request packet that has a destination address (e.g., a VIP) associated with a set of DCNs, the load balancer embeds this address in a particular header field of the packet. This is, of course, after performing a load balancing algorithm and selecting an end machine to which, based on the performed algorithm, the request has to be sent. In some embodiments, the load balancer generates a particular value that is associated with the VIP address (i.e., the reverse source address) and inserts the generated value into the data message In order to forward the data message towards the identified server, the load balancer performs a destination network address translation (DNAT) on the received data message to replace the destination address with the identified server's address and then forwards the data message towards the destination server. In some embodiments, a DSHR module that runs in a host machine along with the selected server machine intercepts the data message on its way towards the server. The DSHR module generates a reverse data flow entry based on the identification data carried by the data message.

For instance, based on the five-tuple of a packet, the DSHR module generates a reverse flow entry and associates the generated entry with the reverse source address (i.e., the VIP address) retrieved from the particular header field of the data message. For example, the DSHR module assigns the source IP and port of the packet as the destination IP and port of the reverse flow entry and assigns the destination IP and port of the packet as the source IP and port of the reverse flow entry. In some embodiments, in addition to the reverse flow entry, the DSHR module generates a forward flow entry for the data message as well and associates this entry with the reverse flow entry and the retrieved VIP address.

The DSHR module stores the generated entries as well as the associated VIP address in a corresponding data storage in some embodiments (e.g., a local data flow storage on the host machine). In some embodiments, the DSHR module generates these flow entries (forward and reverse flow entries) only for a first data message that is received from a DCN. Any subsequent data message from the DCN simply passes through the DSHR module. In some embodiments, when a DSHR module receives a packet, it matches the identification data of the packet (five-tuple of the packet) against the data storage first. If a match is found, the DSHR module forwards the packet towards its destination. However, when no match is found, the DSHR module generates the flow entries and stores them in the data storage before forwarding the packet towards the destination.

When the server machine processes the data message received from the DSHR module and sends out the return traffic in response to the data message, the DSHR module catches the return traffic before this traffic leaves the host machine. The DSHR module then looks up the data flow storage to find a corresponding reverse source address for the return traffic. When a match is found, the DSHR module performs a source network address translation (SNAT) on the return traffic in order to replace the source addresses of the data messages (i.e., the server's address) with the associated reverse source address found in the data flow table. This way, when the client machine (i.e., the originator of the initial data message) receives the return traffic, the client machine thinks that the return traffic is received from the same VIP address to which the initial data message was sent.

In other words, the return traffic bypasses the load balancer while the requesting DCN thinks that the traffic is received from the load balancer. As stated above, the LB module of some embodiments redirects the return traffic without making any changes in the configuration of the server machine that generates the return traffic. That is, by employing the LB module, a need for configuring particular loopback addresses and/or installing particular modules in the server machines is eliminated. Since some embodiments insert an associated value (instead of a real physical address) as the reverse source address in the data messages, the LB module of some such embodiments needs a mapping table (e.g., stored in a local data storage) in order to map the inserted value to its corresponding VIP address.

Figure 3:
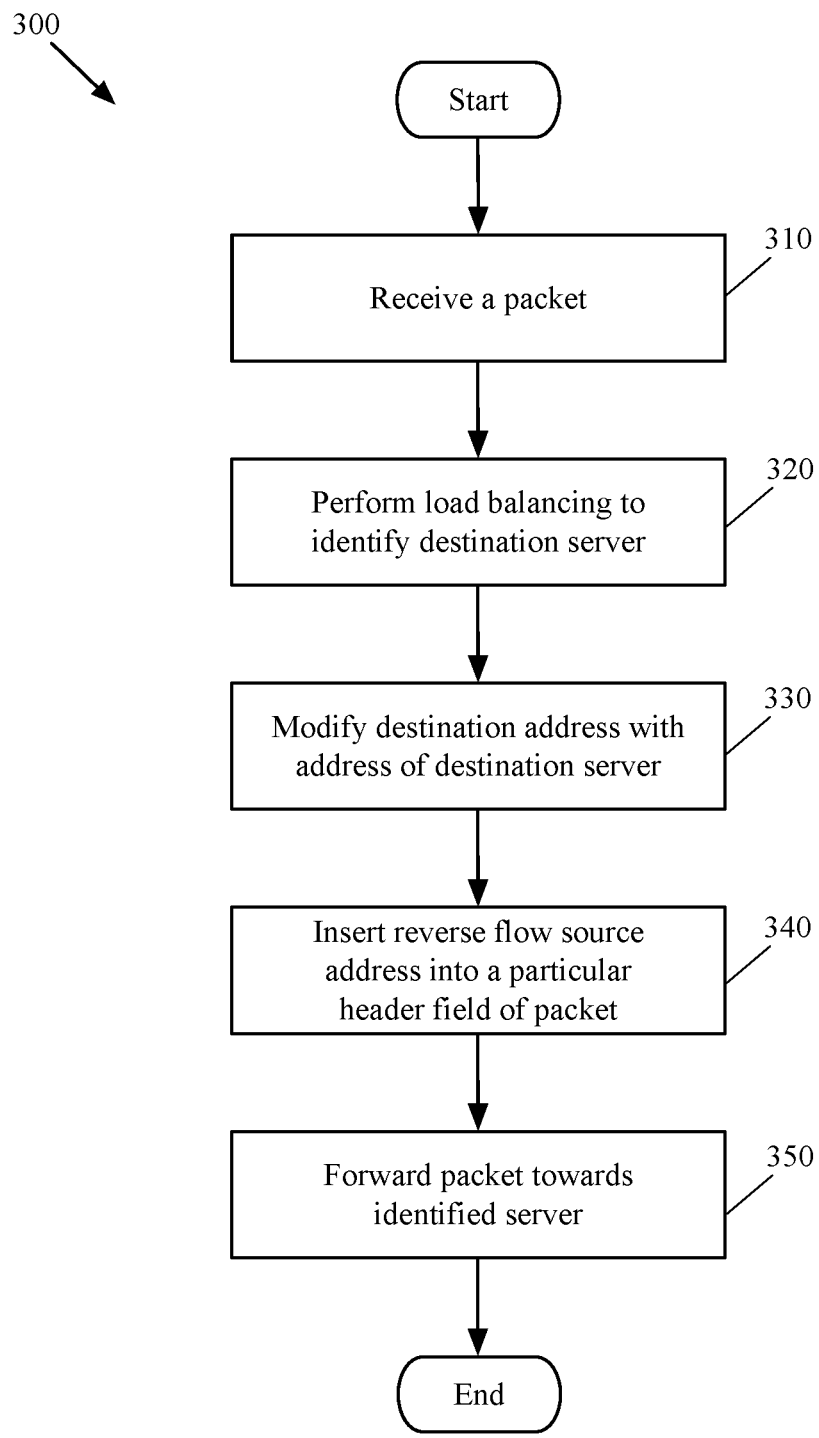
FIG. 3 conceptually illustrates a process of some embodiments for bypassing a load balancer on a return path of network traffic.

FIG. 3 conceptually illustrates a process 300 of some embodiments for bypassing a load balancer on a return path of network traffic. The process 300 is performed by a load balancer that receives incoming network traffic to be forwarded to a particular machine (e.g., a server). The process starts by receiving (at 310) a packet. The packet can be a request packet for data from a set of machines that are associated with a destination address (e.g., destination IP address) of the packet. The packet might be received from an external network (e.g., outside or within a hosting system's network) or it might be received from another node within the same network as the load balancer.

The process then performs (at 320) a load balancing algorithm for the packet. The process does so to identify the best candidate machine that can provide the requested data to the generator of the request. The load balancing algorithm can be defined in the load balancer's configuration data received from a user (e.g., a network administrator). After identifying the best candidate machine, the load balancer performs a DNAT (at 330) on the packet to change the destination address of the packet to the identified candidate's address. For example, the process modifies the destination IP address and port number of the packet to the IP address and related port number of the identified machine.

This way, however, if the process sends the packet towards the destination server, the server will use the source and destination addresses of the packet to return the requested data in a reverse flow. That is, the server uses its own address as the source address and the client machine which requested the data as the destination address. Consequently, when the client machine receives the data packet (in response to the request packet), the client machine gets confused since it does not recognize the source of the data. This is because the advertised address that the client data had originally used was one of the VIP addresses associated with the load balancer and not the real physical address of one of the servers.

In order to avoid this confusion, the load balancer also inserts (at 340) a reverse source address into a particular header field of the packet (e.g., in the differentiated services code point (DSCP) header) before forwarding the data message towards a server. This reverse source address is the same destination address that the client machine has assigned to the packet (i.e., the advertised VIP address). In some embodiments, as described above, the load balancer generates a corresponding value for each of the VIPs in an advertised set of VIPs and inserts the corresponding value of the VIP into the packet. On the other hand, when a DSHR module receives the packet, it uses a map table that identifies the corresponding VIP from the value carried by the packet.

After performing the DNAT and modifying the packet, the process forwards (at 350) the modified packet towards the destination server that is selected by the load balancer. The process then ends. The server then, based on the type of request, provides the requested data to the client (as will be discussed in more detail below) without sending the reverse flow to the load balancer. That is, the DSHR module that is associated with the server (both running on the same host machine) sends the requested data directly to the client machine.

The specific operations of the process 300 may not be performed in the exact order shown and described. For example, the process first performs an encapsulation operation on the packet in order to encapsulate the packet with the necessary tunneling data (of a particular tunneling protocol such as VXLAN) in order to tunnel the packet towards the destination server. Such an encapsulation in some embodiments includes adding a source virtual tunnel end point (VTEP) and a destination VTEP to the packet. The source VTEP is a VTEP, for example, that is implemented by a managed forwarding element of an edge node that implements a logical load balancer, while the destination VTEP is implemented by a managed forwarding element that operates on the same host machine as the selected server machine.

Additionally, the specific operations may not be performed in one continuous series of operations, and different specific operations may be performed in different embodiments. Also, one of ordinary skill in the art would realize that the process 300 could be implemented using several sub-processes, or as part of a larger macro process.

Figure 4:
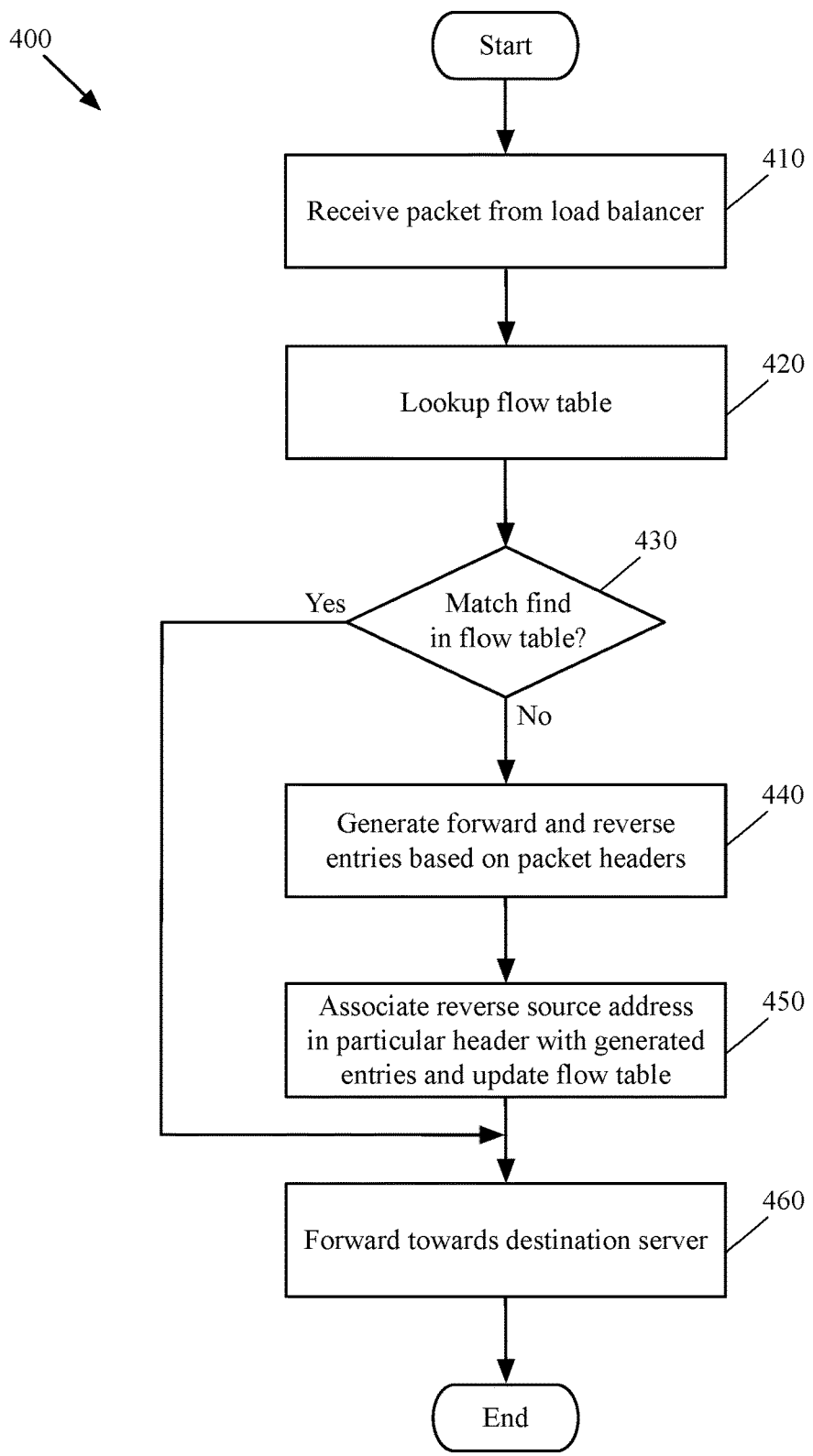
FIG. 4 conceptually illustrates a process of some embodiments that intercepts incoming data messages for a DCN running on a host machine in order to modify the subsequent return network traffic originated by the DCN.

FIG. 4 conceptually illustrates a process 400 of some embodiments that intercepts incoming data messages for a DCN running on a host machine in order to modify the subsequent return network traffic originated by the DCN. The process 400 is performed by a DSHR module that runs on the host machine on which the DCN runs. The process starts by receiving (at 410) a packet that is modified by a load balancer. The packet, as described above, might be a request packet for data from the DCN sent by another DCN and passed through the load balancer.

After receiving the packet, the process matches (at 420) the identification data stored in the packet (e.g., the five-tuple of the packet which are source IP address, destination IP address, source port number, destination port number, and protocol) against a data storage. This data storage contains the forward and reverse flow entries for every first packet of a data flow. As such, by matching the packet against the data storage the process can determine (at 430) whether the packet is a first packet of a data flow or not. Some other embodiments use other methods to determine a packet is a first packet or not.

When the process determines that the packet is not a first packet in the flow (i.e., when a match is found in the table), the process proceeds to operation 460 which is described below. On the other hand, if the process does not find any match in the data storage (i.e., the packet is a first packet), the process generates (at 440) a forward flow entry and a reverse flow entry for the packet based on the identification information of the packet. Some embodiments only generate a reverse flow entry while other embodiments generate both forward and reverse entries.

The process of some embodiments reads (at 450) the VIP address (or a value corresponding to the VIP address) that is inserted by the load balancer in a particular header field of the packet. After identifying the VIP address (e.g., from a mapping table that maps a set of values to a set of VIP addresses), the process associates the generated entries for the packet with the identified VIP address and stores this data in the data storage (i.e., the same data storage against which the identification data of the packet was initially matched). After updating the data storage, the process forwards (at 460) the packet towards the destination server. The process then ends.

The specific operations of the process 400 may not be performed in the exact order shown and described. For example, the above-described process determines whether a packet is a first packet of a data flow or not by matching the packet against a database that gets populated each time a first packet of data flow is received. In order to make such a determination, however, the process does not necessarily have to match the packet against such database. Some network protocols insert particular data in the first packet of a data flow that identifies the packet as the first packet.

For some such networks, the process can determine whether the packet is a first packet of a flow or not by simply looking at the identification data of the packet. Additionally, the specific operations may not be performed in one continuous series of operations, and different specific operations may be performed in different embodiments. Also, process 400 could be implemented using several sub-processes, or as part of a larger macro process.

Figure 5:
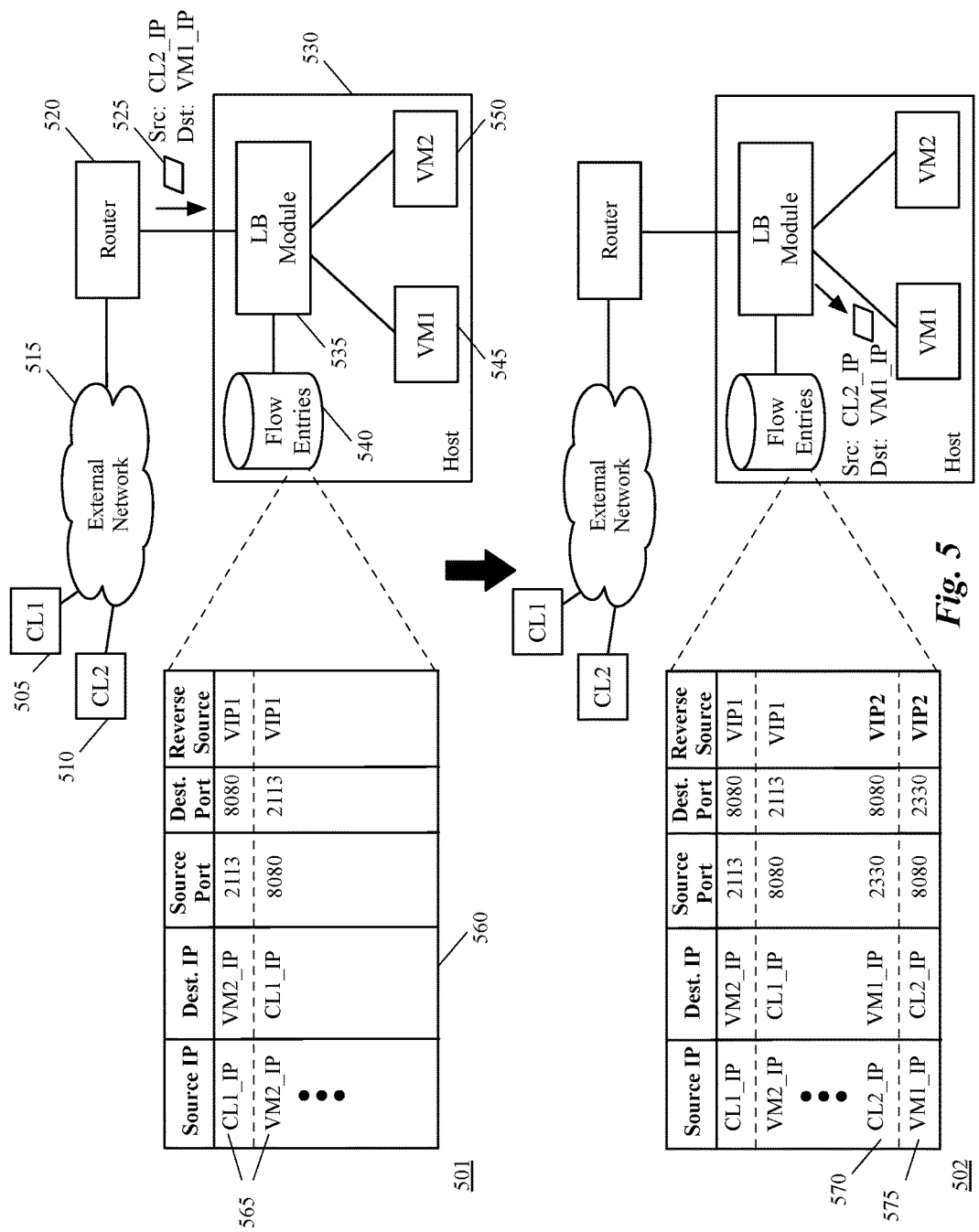
FIG. 5 illustrates an example of updating a data flow table by a load balancing module that operates in the hypervisor of a host machine.

FIG. 5 illustrates an example of updating a data flow table by a load balancing module that operates in the hypervisor of a host machine. Specifically, this figure shows, through two stages 501 and 502, how an LB module intercepts a packet received from a load balancer (or a router to which the load balancer is coupled) and updates a local data storage with forward and reverse flow entries based on the identification data of the packet.

The figure includes an external network 515 that connects two client machines 505 and 510 to a network through the router 520. The figure also includes a host machine 530 that hosts two virtual machines 545 and 550 and executes a load balancing module 535 that retrieves and stores data from and to a local data storage 540. The local data storage 540 includes a table 565 that contains different flow entries for different flows that have passed through the LB module 535.

The first stage 501 shows that a packet 525 is being transmitted from the router 520 towards the LB host machine 530. Although not shown, the packet has been received from the client 510 through the external network 515 and load balanced by a load balancer that is coupled to the router 520. The load balancing resulted in selecting the VM 545 as the destination server for the packet. As shown in this stage, the source address of the packet 525 is CL2_IP (which belongs to the client machine 510) and the destination address of the packet is VM1_IP (which belongs to the server machine 545).

It is important to note that the original destination address of the packet (i.e., the destination address assigned by the client 510) was not VM1_IP. The original destination address, as shown in the second state 502 was VIP2 which is one of the virtual IP addresses that the load balancer advertises for the application implemented by servers 545 and 550. However, after the load balancing and identifying the server 545 as a good candidate for responding to the packet 525, the load balancer has replaced the destination address with the IP address of the server 545.

The first stage also shows that table 560 includes, among other entries, two forward and reverse flow entries 565 that have been previously generated by the LB module 535 and stored in the data storage 540. These two flow entries show that the virtual IP address VIP1 is associated with a reverse flow with source address of VM2_IP and destination address of CL1_IP. These records also include other identification data of the flows which are the source and destination port numbers in each flow.

The second stage 502 shows the packet 525 after it has been processed by the LB module 535. That is, after the packet is received at the host machine 530, the LB module 535 intercepts the packet before it reaches the destination VM 545. The LB module then determines that the packet is a first packet of a data flow (since there is no record in the database for the identification data stored in the packet). Therefore, the LB module reads the value stored in the DSCP header of the packet. This value identifies the reverse source address (i.e., VIP2) that should be stored in the flow table 560.

Figure 7:
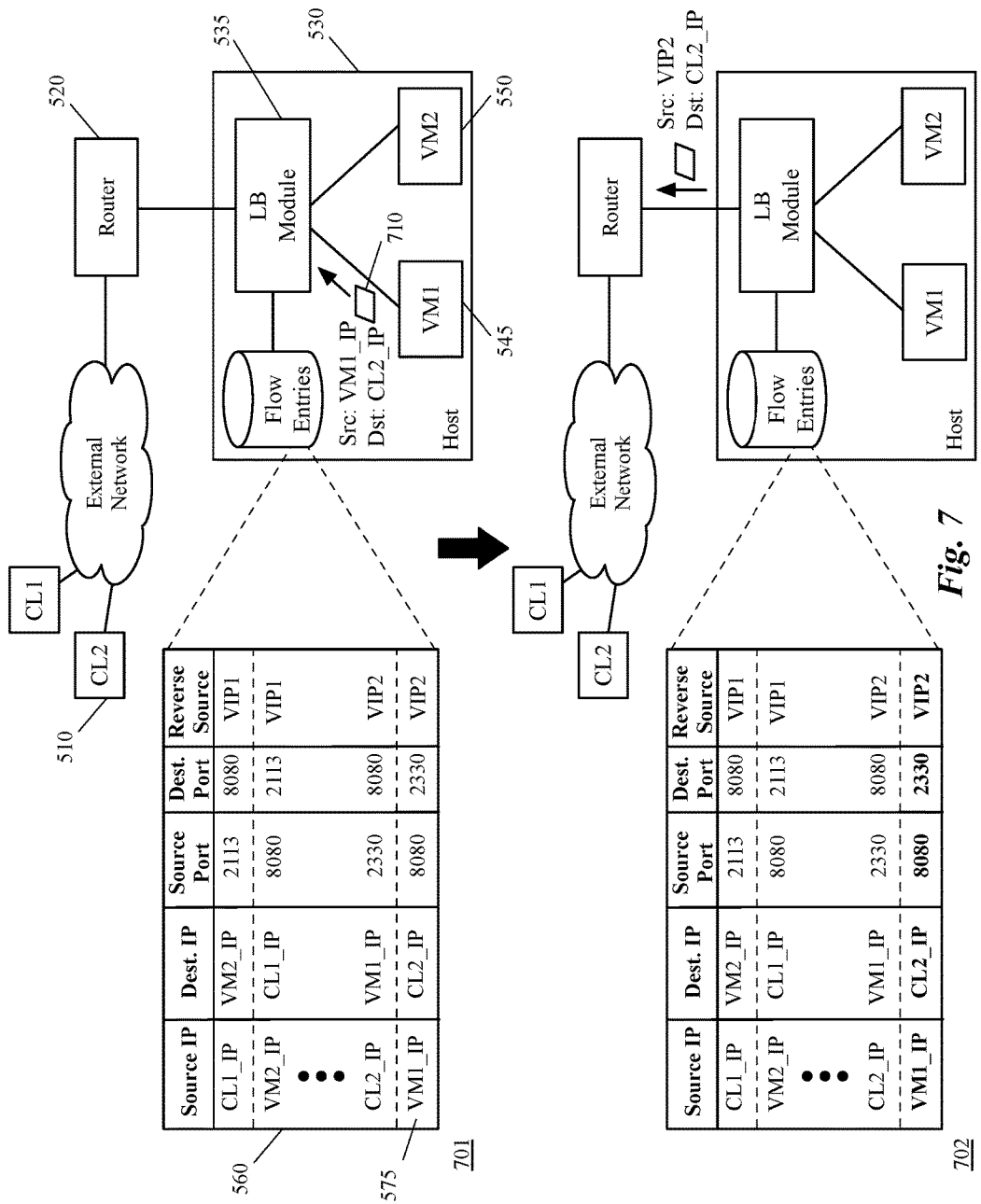
FIG. 7 illustrates an example of utilizing a data flow table by a DSHR module in order to modify the return traffic that bypasses a load balancer.

The LB module 535 also generates two records 570 and 575 from the identification header fields of the packet. As show, the first record 570 is a forward flow entry that is generated based on the information in the packet while the second record 575 is the reverse flow entry generated by the LB module. Both of these entries are associated with the reverse source address in the records. FIG. 7 below shows how the LB module uses these flow entries to modify the return traffic generated by the VM 545 and in response to the request packet 525.

Figure 6:
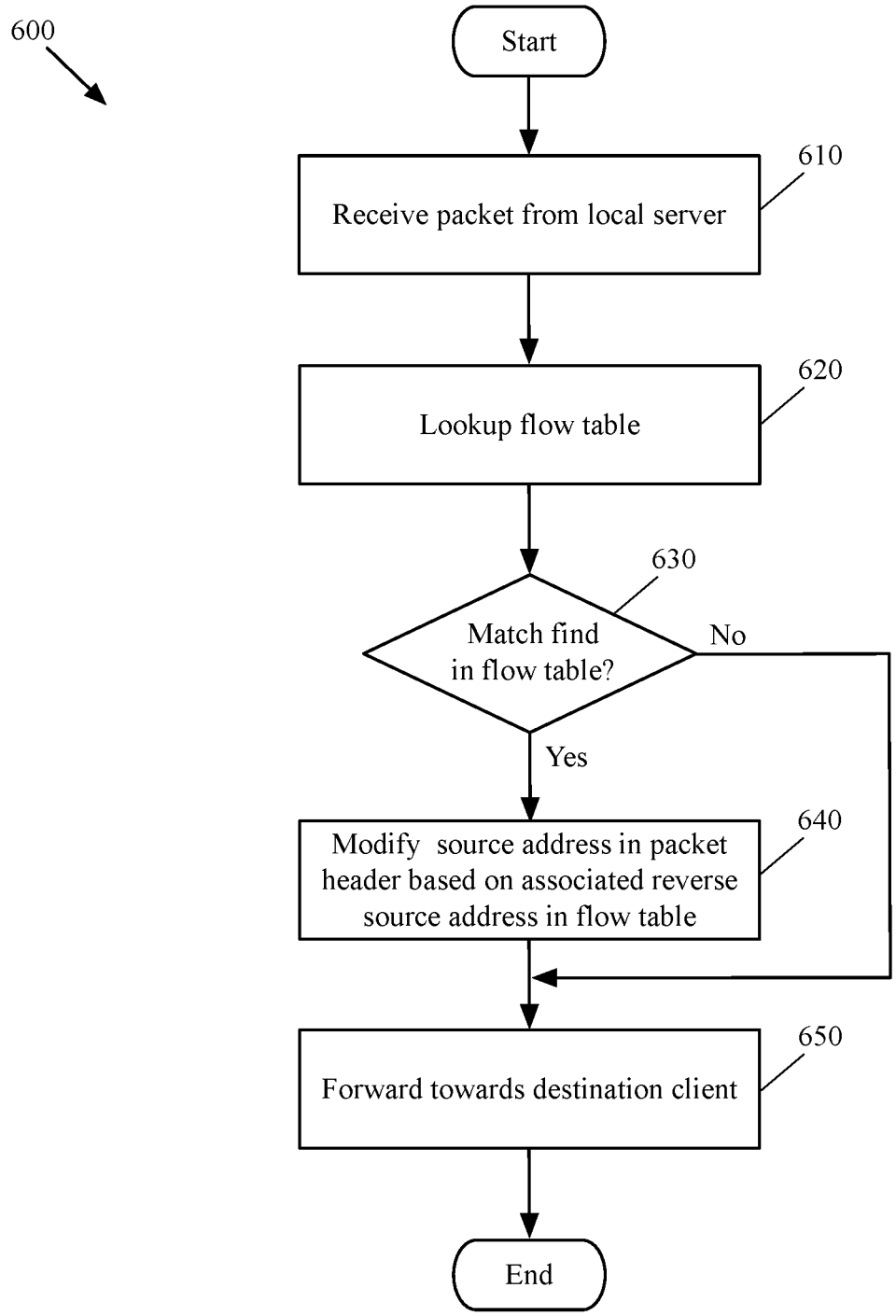
FIG. 6 conceptually illustrates a process of some embodiments that intercepts the outgoing data messages from a DCN running on a host machine in order to modify the return traffic originated by the DCN in response to a request.

FIG. 6 conceptually illustrates a process 600 of some embodiments that intercepts the outgoing data messages from a DCN running on a host machine in order to modify the return traffic originated by the DCN in response to a request. The process 600 is performed by a DSHR (LB) module that runs on the same host machine as the DCN. The process starts by receiving (at 610) a packet from the local DCN (server). The packet is one of the data packets that the server generates in response to an incoming request by another machine (e.g., a client machine) for the data packets.

After receiving the packet, the process matches (at 620) the identification data stored in the packet (e.g., the five-tuple of the packet) against the data storage in which forward and reverse flow entries are stored. The process then determines (at 630) whether a match is found in the data storage. That is, the process determines whether the packet is a packet that is sent in response to a request for which data entries were previously generated or not. When the process determines that no match is found, the process proceeds to operation 650 which is described below. When no match is found, the process realizes that the intercepted packet is not a response to a load balanced traffic received from a particular machine. As such the packet does not need any modification by the LB module.

On the other hand, if the finds a match in the data storage (i.e., a request packet for this return traffic has been previously processed), the process modifies (at 640) the source address data in the packet header. That is, when a match is found, the process replaces the source address of the received packet (e.g., the server's IP address) with the reverse source address (e.g., a VIP address) that is associated with the reverse flow entry of the table.

After performing the SNAT on the received packet (i.e., modifying source address of the packet), the process forwards (at 650) the packet towards the machine that requested this return traffic. The process then ends. The specific operations of the process 600 may not be performed in the exact order shown and described. Additionally, the specific operations may not be performed in one continuous series of operations, and different specific operations may be performed in different embodiments. Also, process 600 could be implemented using several sub-processes, or as part of a larger macro process.

FIG. 7 illustrates an example of utilizing a data flow table by a DSHR module in order to modify the return traffic that bypasses a load balancer. Specifically, this figure shows, through two stages 701 and 702, how an LB module intercepts a packet received from a local server (that is sent in response to a load balanced request) and uses a local data storage to perform an SNAT on the packet. This figure is very similar to FIG. 5 described above, with the exception that in this figure, the LB module intercepts the traffic received from a local server instead of a load balancer.

Similar to FIG. 5, this figure also shows the external network that connects two client machines to a logical network through the router 520. The logical network is partially implemented by the host machine 530 which hosts two virtual machines 545 and 550 and executes a load balancing module 535 that interacts with a local data storage. The local data storage includes a table 560 that contains different flow entries for different flows that have passed through the LB module 535.

The first stage 701 shows an outgoing packet 710 being transmitted from the virtual machine 545. As shown, the source address of the packet 710 is VM1_IP (i.e., the address of VM1) and the destination address of the packet is CL2_IP, which belongs to the client machine 510 outside of the network. The packet 710 is generated in response to a request from this client machine. Even though the destination address of the packet shows that the packet should be sent out of the host machine 530 towards the client machine 510, before the packet leaves the host machine, the LB module 535 catches the packet.

As described above, the LB module of some embodiments is instantiated in a hypervisor of the host machine. As such, this module works hand in hand with a managed forwarding element (MFE) that also operates in the hypervisor of the host machine and performs forwarding processing for all the incoming and outgoing traffic for the host machine. Therefore, every packet that enters or leaves the host machine can be intercepted by the LB module.

The second stage 702 shows the packet 710 after it has been processed by the LB module 535. That is, after the packet is intercepted, the LB module reads the five-tuple of the packet and looks up the flow table 560 to find the information. As shown in the figure, the highlighted record 575 matches the five-tuple of the packet. This record was previously generated by the LB module when this module received a request packet from the load balancer (e.g., the request packet 525 by reference to FIG. 5 above).

When a match is found in the database (i.e., the flow table 560), the LB module 535 performs an SNAT on the packet before the packet is sent out of the host machine. That is, the LB module replaces the source address of the packet (i.e., VM1_IP) with a reverse source address (i.e., VIP2) that is stored in the table and is associated with the matched reverse flow entry. When the client machine 510 receives the packet 710, the client machine thinks that the packet is received from the same server machine to which the client machine had sent the original request and not an unidentified machine. This way, a two-way communication is established between the client and server machines, where only the incoming traffic to the server machine passes through a load balancer (i.e., the outgoing traffic bypasses the load balancer).

II. L4/L7 DSHR

The previous section described a distributed stateful hypervisor return (DSHR) function that is employed by some embodiments for bypassing a load balancer for layer two and layer three network traffic (also referred to as L2/L3 DSHR). That is, when a load balancer is coupled to the same layer two forwarding element (e.g., a physical or logical L2 switch) to which the server machines are coupled, this method is employed to bypass the load balancer in a reverse traffic. Additionally, when a load balancer is coupled to a forwarding element that is one or more hops away from the servers but the load balancer does not have to know about any higher lever connection status, the L2/L3 DSHR function can be employed to bypass a load balancer in a return traffic.

In some embodiments, a load balancer can determine whether the data messages are sent to DCNs that are on the same L2 Switch as the load balancer or the data messages should be sent to DCNs that are one or more hops away. For example, in some embodiments, the configuration data with which the load balancer is configured and managed, tells the load balancer whether the server machine is on the same switch or not. Based on such a determination, the load balancer of some embodiments is able to determine whether the load balancer should perform an L2/L3 DSHR or a higher level DSHR should be performed.

In L2/L3 DSHR, because the load balancer does not have any visibility on the return traffic, the load balancer cannot maintain a state of a higher network layer connection between the two DCNs that exchange the data. As such, in order to be able to provide many additional services that are provided by a layer four or layer seven load balancer (e.g., URL-based or cookie-based server selection, content manipulation or inspection, malicious attack protection, etc.), some embodiments perform L4/L7 DSHR to preserve a connection state at the LB module instead of the load balancer.

Some embodiments transfer a network connection established at a load balancer to a DSHR module that operates on the same host machine as a selected DCN (i.e., the DCN identified to receive the network traffic from the load balancer). In other words, in some embodiments, the server and client machines establish a direct connection session (e.g., a TCP connection session), through which the server machine receives the forward flow from a load balancer, but forwards the reverse flow directly to the client machine. In order to do so, the load balancer of some embodiments establishes a connection session with a client machine when it receives a connection request from the client machine.

In other words, instead of simply passing a connection request through to a server machine, the load balancer establishes the connection with the client machine upon receiving the connection request. This way, the legitimacy of the client machine can be confirmed by the load balancer as well (since the request, which can be a malicious request and not from a legitimate user, is not forwarded directly to other network entities).

For example, when a load balancer receives a connection request that requires a multi-step handshake for the connection to be established (e.g., a three-way handshake to establish a TCP connection), the load balancer performs the multi-step handshake. That is, instead of selecting a server and passing the request to the selected server, the load balancer performs the handshake itself.

In some embodiments, after establishing the connection and receiving a set of necessary connection parameters (e.g., sequence number, time stamp, window size, negotiated options, etc., for a TCP connection), the load balancer passes these connection parameters over to the DHSR module. The load balancer adds this data (i.e., necessary connection parameters) to a tunnel header of the data message before tunneling the data message to the DSHR module in some embodiments. In some other embodiments, the load balancer inserts the connection parameters into one or more specific header fields of the data message (e.g., in one or more header fields of a TCP SYN packet).

Upon receiving the specially constructed connection request from the load balancer, the DSHR module generates new forward and reverse flow entries for the connection (in the same way as described above for L2/L3 DSHR). The DSHR module also extracts the connection information embedded in the data message and stores this information along with the generated flow entries. In some embodiments, the DSHR module removes the inserted connection parameters from the data message before passing it to the server. The DSHR module of some embodiments then handles any necessary multi-step handshake with the server directly.

That is, when the DSHR module receives an acknowledgement from the server, instead of passing the acknowledgment to the client machine, the DSHR module responds to the server itself. For example, when the server responds with a TCP SYN-ACK to a TCP SYN received from the client machine through the DSHR module, the DSHR module intercepts the SYN-ACK packet and responds back to the server with a TCP-ACK to complete a 3-way handshake with the server directly.

For the remaining data messages in the forward flow (i.e., traffic from client to server), the load balancer only performs a DNAT (to replace destination address with the selected server's address) and sends the traffic out to the server. This traffic is then intercepted by the DSHR module (e.g., operating on the same host machine as the server) to adjust the necessary connection variables (e.g., sequence numbers, TCP selective acknowledgement (SACK) options, timestamp values, etc.) before sending the traffic over to the server. All of the data messages in the reverse flow (i.e., from server to client) are also intercepted by the DSHR module to perform similar adjustments on the connection parameters before sending the return traffic directly to the client.

Figure 8:
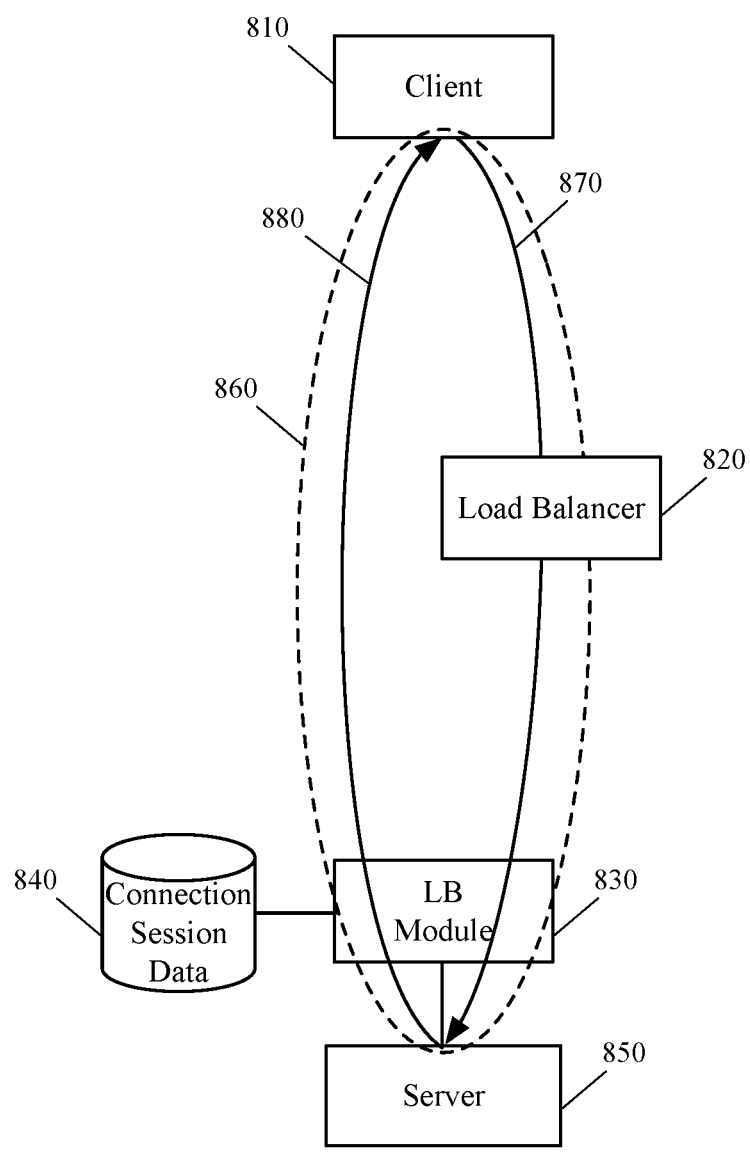
FIG. 8 illustrates a layer four (e.g., TCP) connection that is established between two data compute nodes, in which a forward flow in the connection passes through a load balancer while the reverse flow of the connection bypasses the load balancer.

FIG. 8 illustrates a layer four (e.g., TCP) connection that is established between two data compute nodes, in which a forward flow in the connection passes through a load balancer while the reverse flow of the connection bypasses the load balancer. This figure includes a client machine 810, a load balancer 820, a DSHR module 830 that interacts with a data storage 840, and a server machine 850.

As shown in the figure, a higher layer connection session 860 has been established between the server machine 850 and the client machine 810. The higher layer connection can be a layer four connection session such as a TCP connection session or a layer seven connection session such as an HTTP connection session, or any connection in between. The figure shows that the connection session 860 includes a forward flow 870 that passes through the load balancer 820 and a reverse flow 880 that does not pass through this load balancer and goes directly from the server machine 850 to the client machine 810.

In order to make this possible, the DSHR module and the load balancer work together hand in hand to keep track of the connection state. For example, when the load balancer 820 establishes an initial connection with the client machine, the load balancer forwards the connection state data to the DSHR module 830. The module stores this data in the data storage 840 and updates the data storage upon subsequent data exchanged between the client and server machines. This way, the load balancer does not have to keep track of the state of the connection and the DSHR module at the host machine of the server does this task for the load balancer. As a result, the load balancer does not have to have any visibility to the return traffic from the server 850 to the client 810.

Figure 9:
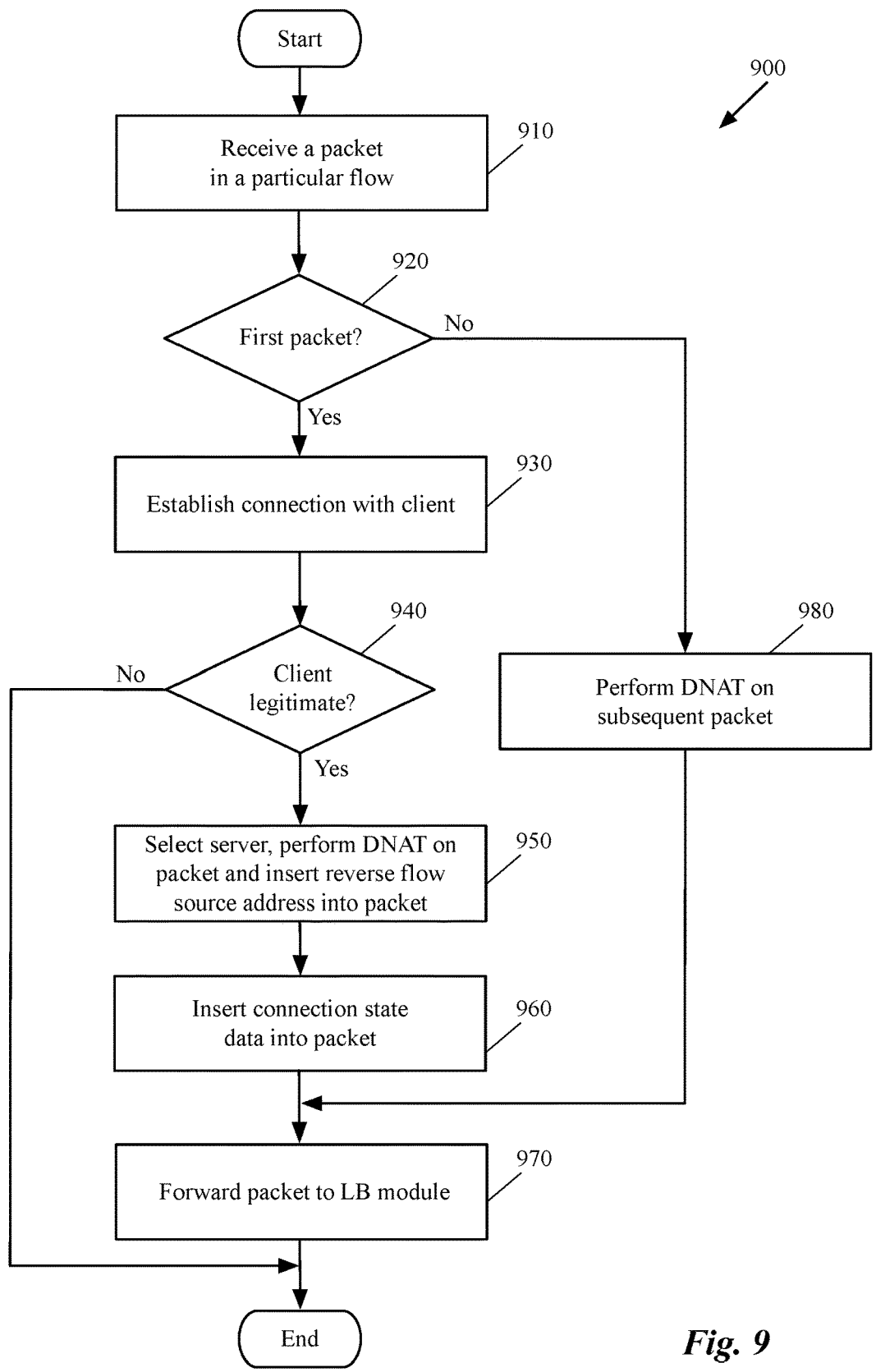
FIG. 9 conceptually illustrates a process of some embodiments for establishing connection with a data compute node that requests the connection and forwarding the connection state to a DSHR module.

FIG. 9 conceptually illustrates a process 900 of some embodiments for establishing connection with a data compute node that requests the connection and forwarding the connection state to a DSHR module. The process 900 is performed by a load balancer that receives a connection request from a DCN (e.g., a client machine) forwarded to another DCN (e.g., a server machine). The process starts by receiving (at 910) a packet in a particular flow from the source machine to the destination machine.

The packet can be a TCP connection request that requests for data (e.g., a video stream) to be transferred within a connection between a client machine and a server machine in a set of server machines. Each server machine in the set of server machines is associated with the same destination address of the packet. The destination address of the packet is one of a set of addresses (e.g., VIP addresses) that a load balancer advertises for the set of server machines. The the load balancer may receive the packet from an external network (e.g., outside or within a hosting system's network) or it may receive the packet from another endpoint (e.g., a DCN) within the same network as the load balancer.

The process then determines (at 920) whether the received packet is a first packet of the particular data flow or any of the subsequent packets. The process of some embodiments make such a determination by looking into the identification data in the packet headers. For example, for a TCP connection, the first packet is a SYN packet in which a SYN flag in a particular TCP header of the packet is set. When the process determines that the packet is one of the subsequent packets of the data flow, the process simply performs (at 980) a DNAT on the packet to replace the destination address of the packet with preselected server's address (i.e., a server that has previously been selected for this data flow). The process then proceeds to operation 970 which is described below.

On the other hand, if the process determines that the received packet is the first packet of the particular data flow, the process tries to establish (at 930) a connection with the client machine that requested the connection. As described above, in order to establish a connection, the process of some embodiments, depending on the network protocol, performs a multi-step handshake with the requesting machine (e.g., a three-way handshake for a TCP connection). The connection request is not always from a legitimate client machine. For example, the connection request might be a malicious attack that is not backed up by any client machine.

Next, the process determines (at 940) whether the request is received from a legitimate client machine. For example, when the process determines that it cannot make a connection based on the received request (e.g., does not receive any ACK message back after the process sends a SYN-ACK to the requestor), the process can determine that the received request was not from a legitimate client machine. When the process determines that the client machine is not a legitimate machine, the process ends.

On the other hand, when the process determines that the connection request is received from a legitimate client machine, the process performs (at 950) a load balancing algorithm on the packet. The process does so to identify the best candidate machine that can provide the requested data to the generator of the request. The load balancing algorithm can be defined in the load balancer's configuration data received from a user (e.g., a network administrator). After identifying the best candidate machine, the load balancer performs a DNAT on the packet to change the destination address of the packet to the identified candidate's address. For example, the process modifies the destination IP address and port number of the packet to the IP address and related port number of the identified machine.

This way, however, if the process sends the packet towards the destination server, the server will use the source and destination addresses of the packet to return the requested data in a reverse flow. That is, the server uses its own address as the source address and the client machine which requested the data as the destination address. Consequently, when the client machine receives the data packet (in response to the request packet), the client machine gets confused since it does not recognize the source of the data. This is because the advertised address that the client data had originally used was one of the VIP addresses associated with the load balancer and not the real physical address of one of the servers.

In order to avoid this confusion, the load balancer also inserts a reverse source address into a particular header field of the packet (e.g., in the DSCP header) before forwarding the data message towards a server. This reverse source address is the same destination address that the client machine has assigned to the packet (i.e., the advertised VIP address). In some embodiments, as described above, the load balancer generates a corresponding value for each of the VIPs in an advertises set of VIPs and inserts the corresponding value of the VIP into the packet. On the other hand, when a DSHR module receives the packet, it uses a map table that identifies the corresponding VIP from the value carried by the packet.

The process of some embodiments also inserts (at 960) a set of connection parameters and variables in the packet (e.g., in one or more headers of the packet, in one or more tunnel headers of the packet) in order to transfer the state of the connection to the destination machine. As described above, these connection state parameters can be different for different protocols. For example, for a TCP protocol, the parameters include, but are not limited to, a sequence number, a time stamp, a window size, negotiated TCP options, etc. After performing the DNAT and modifying the packet to insert the connection state data and the reverse source address, the process forwards (at 970) the modified packet towards the destination server that is selected by the load balancer. The process then ends.

The specific operations of the process 900 may not be performed in the exact order shown and described. Additionally, the specific operations may not be performed in one continuous series of operations, and different specific operations may be performed in different embodiments. Also, one of ordinary skill in the art would realize that the process 900 could be implemented using several sub-processes, or as part of a larger macro process. For instance, the forwarding operation 970 may include multiple steps for tunneling the packet to the host machine that executes the selected server.

For example, the process first performs an encapsulation operation on the packet in order to encapsulate the packet with the necessary tunneling data (of a particular tunneling protocol such as VXLAN) in order to tunnel the packet towards the destination server. Such an encapsulation in some embodiments includes adding a source virtual tunnel end point (VTEP) and a destination VTEP to the packet. The source VTEP is a VTEP, for example, that is implemented by a managed forwarding element of an edge node that implements a logical load balancer, while the destination VTEP is implemented by a managed forwarding element that operates on the same host machine as the selected server machine.

Figure 10:
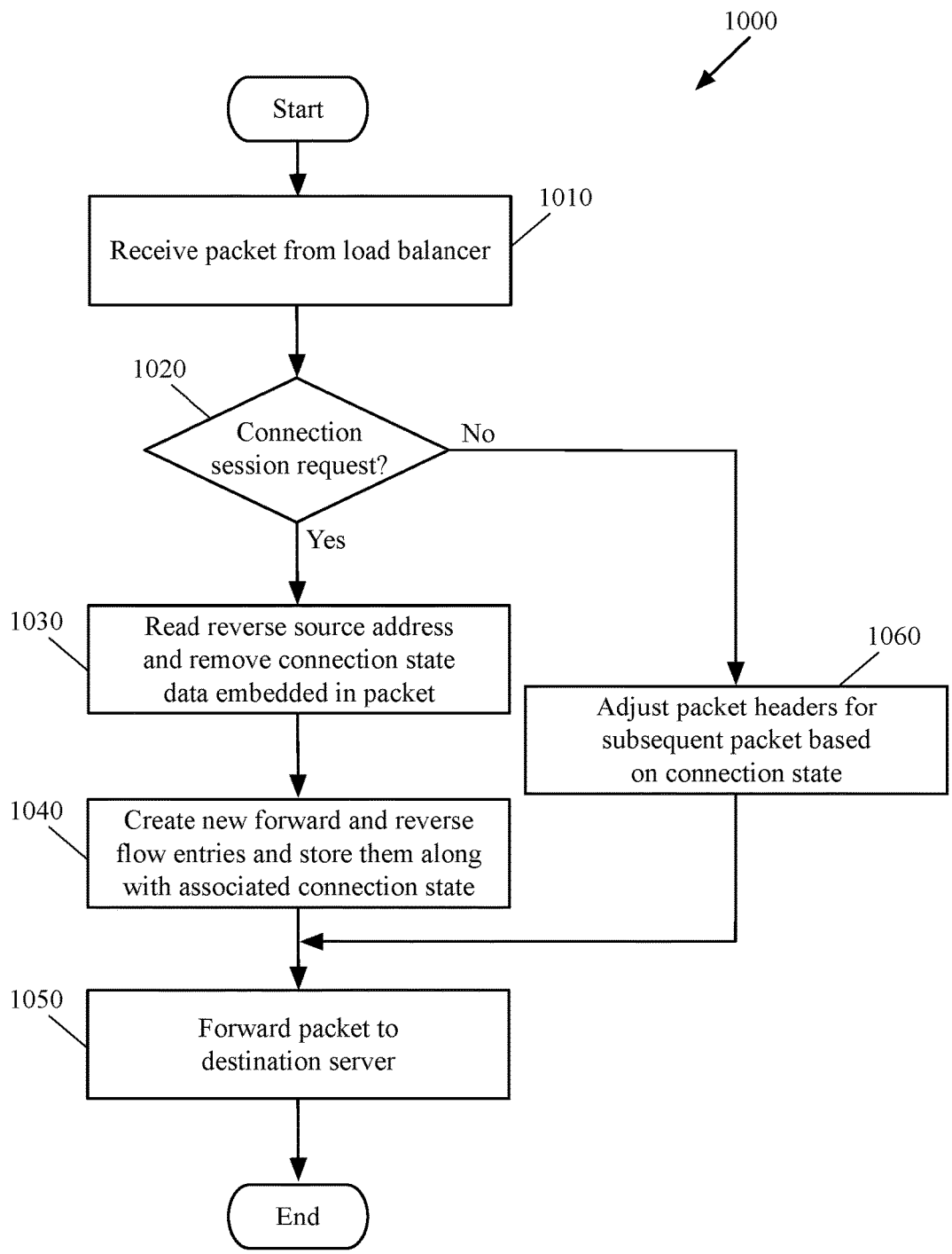
FIG. 10 conceptually illustrates a process of some embodiments that generates and maintains connection state information for a first DCN that executes on a host machine in order for the first DCN to exchange data with a second DCN within a connection session.

FIG. 10 conceptually illustrates a process 1000 of some embodiments that generates and maintains connection state information for a first DCN that executes on a host machine in order for the first DCN to exchange data with a second DCN within a connection session. The process 1000 is performed by an L4/L7 DSHR module of some embodiments that runs on the host machine on which the first DCN runs. The process starts by receiving (at 1010) a packet that is modified by a load balancer. The packet, as described above, might be a connection request or a subsequent packet in a connection sent by the second DCN and passed through the load balancer.

After receiving the packet, the process determines (at 1020) whether the packet is an initial connection session request or a subsequent packet in a data flow of an already established connection session. When the process determines that the packet is subsequent packet of a data flow, the process adjusts (at 1060) the connection variables in the packet headers based on the connection state data stored in a connection state table (such as the connection state table 840 described above by reference to FIG. 8). That is, for all subsequent forward traffic (i.e., from client to server), the process performs splicing by adjusting the client's side ACK number and any necessary TCP options (e.g., SACK windows, timestamp values, etc.) before sending the packet over to the server machine.

On the other hand, when the process determines that the packet is an initial packet that contains the connection state data (in the packet or tunnel headers), the process extracts (at 1030) this data from the packet (i.e., the process may read and remove the data from the header fields). Similar to process 400 of FIG. 4, the process also generates a forward flow entry and a reverse flow entry for the packet based on the identification information of the packet. The process also reads the reverse source address embedded in the packet (or a value corresponding to the VIP address) by the load balancer.

After identifying the VIP address (e.g., from a mapping table that maps a set of values to a set of VIP addresses), the process associates the generated entries for the packet with the identified VIP address and stores this data along with the extracted connection state data in the data storage. In some embodiments, the same data storage contains both flow entries and the connection state data (e.g., in the same or different tables), while in some other embodiments different data storages hold these different data. After updating the data storage(s), the process forwards (at 1050) the packet towards the destination server. The process then ends.

The specific operations of the process 1000 may not be performed in the exact order shown and described. Additionally, the specific operations may not be performed in one continuous series of operations, and different specific operations may be performed in different embodiments. Also, process 1000 could be implemented using several sub-processes, or as part of a larger macro process.

For instance, the process 1000 may also include some steps for handling the return traffic that is sent by the server to the client in response to the client's request. For example, for the return traffic, the process of some embodiments intercepts the traffic (e.g., at the hypervisor of the host machine). The process then performs another TCP splicing similar to the one described above in order to adjust the TCP variables and options. The process then sends out the traffic to the client directly, bypassing the load balancer.

While some higher layer load balancing features (e.g., data compression, deep packet inspection, etc.) can be implemented with the above-described L4/L7 DSHR module, for some other higher layer features (e.g., cookie persistence, multiple HTTP request within a single TCP connection, etc.) the DSHR module of some embodiments takes one or more additional steps. For example, when there are multiple requests (e.g., HTTP requests) within the same connection session (e.g., a TCP connection session), each DSHR module that receives an HTTP connection request has to send an acknowledgment back to the load balancer as soon as the requested traffic is sent out.

Upon receiving this acknowledgment from a server, the load balancer can send another queued HTTP request (if any) to a second server. Therefore, each time the load balancer of some embodiments receives a new HTTP request, it checks to see if it has received an acknowledgement back from a previous connection with a server. In some embodiments, the load balancer places the request in a queue if the previous server has an active HTTP connection with the client (i.e., no acknowledgment has been received from the server yet). Otherwise, when there is no active HTTP session, the load balancer simply passes the request to the next selected server (e.g., based on the content of the request).

In some embodiments, the load balancer has to terminate the last TCP connection with the client first and then look inside the received HTTP request before the load balancer selects the next server. In other words, the load balancer reads the complete request coming from the client and uses the content of the data messages to select a specific server. The load balancer then hands over the connection state and the data to the LB module to be presented to the server. Once the server is done responding directly to the client, the LB module can hand over the state connection to the load balancer for the next HTTP request.

Therefore, unlike an L4 DSHR, in which a multi-step handshake is required (i.e., no content inspection is required), an L7 DSHR may require proper stack processing such as acknowledging and buffering data, handling retransmissions, etc. As such, the connection parameters that need to be transferred under L7 DSHR could be substantially more than a simple connection state transfer under L4 DSHR.

Figure 11:
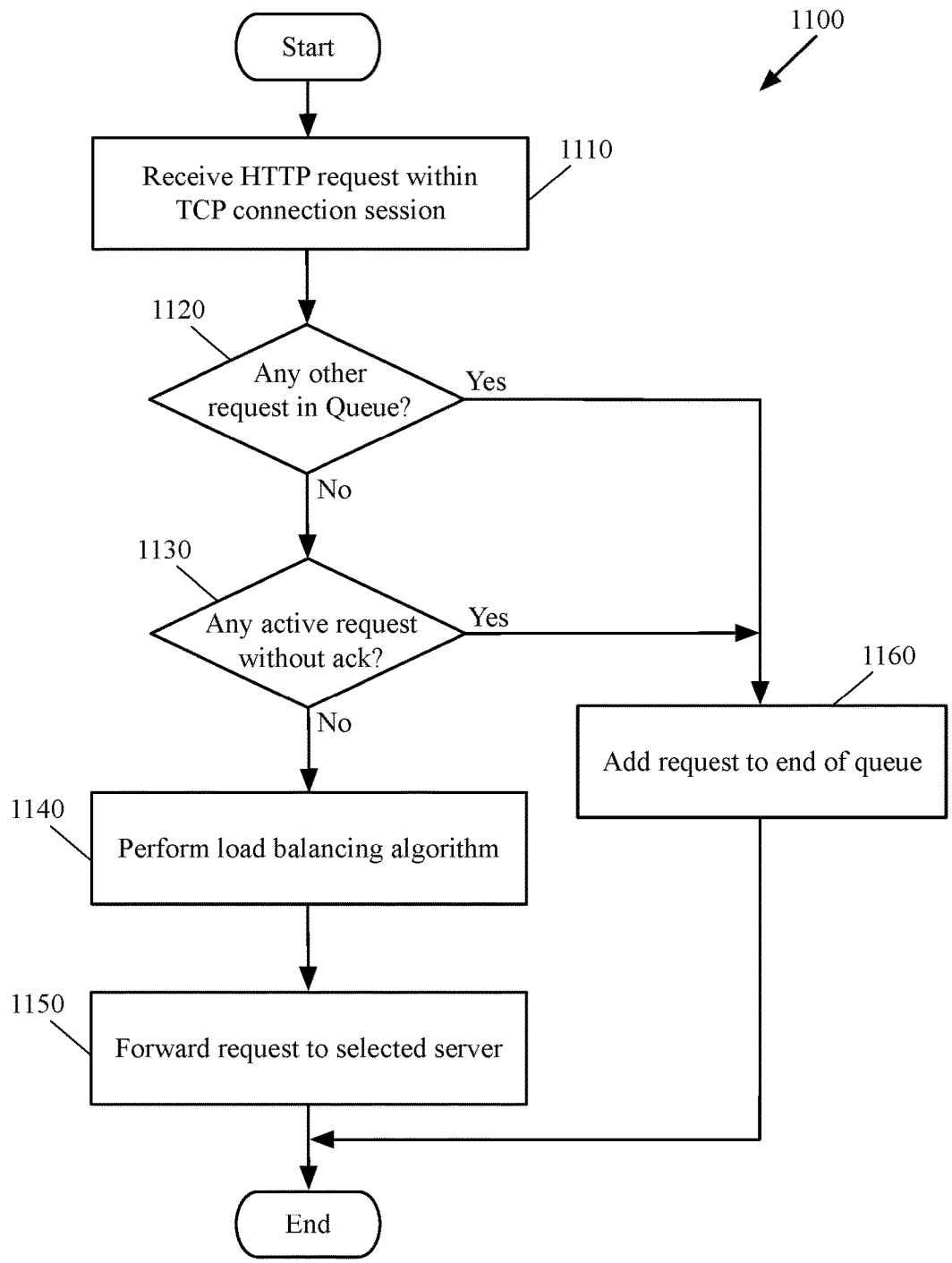
FIG. 11 conceptually illustrates a process of some embodiments for bypassing a layer seven load balancer in a return traffic path.

FIG. 11 conceptually illustrates a process 1100 of some embodiments for bypassing a layer seven load balancer in a return traffic path. Specifically, this figure shows a process for bypassing the load balancer when there are multiple HTTP requests received from a client within a single TCP connection. The process 1100 is performed by an L4/L7 DSHR module of some embodiments that runs on the host machine on which a server executes. The process starts by receiving (at 1110), through a load balancer, a packet that carries an HTTP request from a client machine.

After receiving the request, the process determines (at 1120) whether there is any other HTTP request that was queued from before. The process makes such a determination because the same client machine might have sent several HTTP requests to connect to several different servers after a TCP connection session was established for the server. When the process determines that there are other HTTP requests in the queue, the process adds (at 1160) the last received request to the end of the queue. The process then ends.

On the other hand, when the process determines that no other request is queued, the process determines (at 1130) whether there is any active HTTP session within the TCP connection. That is, the process determines whether there has been an HTTP request that was sent to a particular server, and for which an acknowledgment for end of data transfer is not received from the particular server. When the process determines that there is an active HTTP session currently established with a server, the process adds (at 1160) the last received HTTP request to the end of the queue. The process then ends.

However, when the process realizes that there is no active HTTP session, the process performs (at 1140) a load balancing algorithm (e.g., based on the content of the packet and not just based on the packet headers data) in order to select the best candidate server with which the HTTP connection can be established. The process then forwards (at 1150) the request to the selected server. It is important to note that for forwarding the request, some embodiments transfer the TCP connection state data to the new server as well. For example, when the newly selected server does not operate on the same host machine the executes the last server with which a TCP connection was established, the load balancer has to hand over the TCP connection session to the newly selected server first. This is of course after receiving the connection data from the last server.

In other words, in some embodiments, whenever a server finishes a data transfer in response to an HTTP request, the associated DSHR module of the server sends an end of transfer acknowledgement along with the latest TCP state data back to the load balancer. The load balancer then uses the acknowledgment to know that a new HTTP request can be processed. The load balancer also uses the connection state data in order to send to a newly selected server (i.e., to an associated DSHR module of the server).

The specific operations of the process 1100 may not be performed in the exact order shown and described. Additionally, the specific operations may not be performed in one continuous series of operations, and different specific operations may be performed in different embodiments. Also, process 1100 could be implemented using several sub-processes, or as part of a larger macro process. For example, the process may have other operations for handling the subsequent packets received in each HTTP session. Specifically, when the process of some embodiments receives a subsequent packet in an HTTP connection, the process does not perform any checking illustrated in the figure and simply passes the packet through to the server that is selected for that connection.

Figure 12:
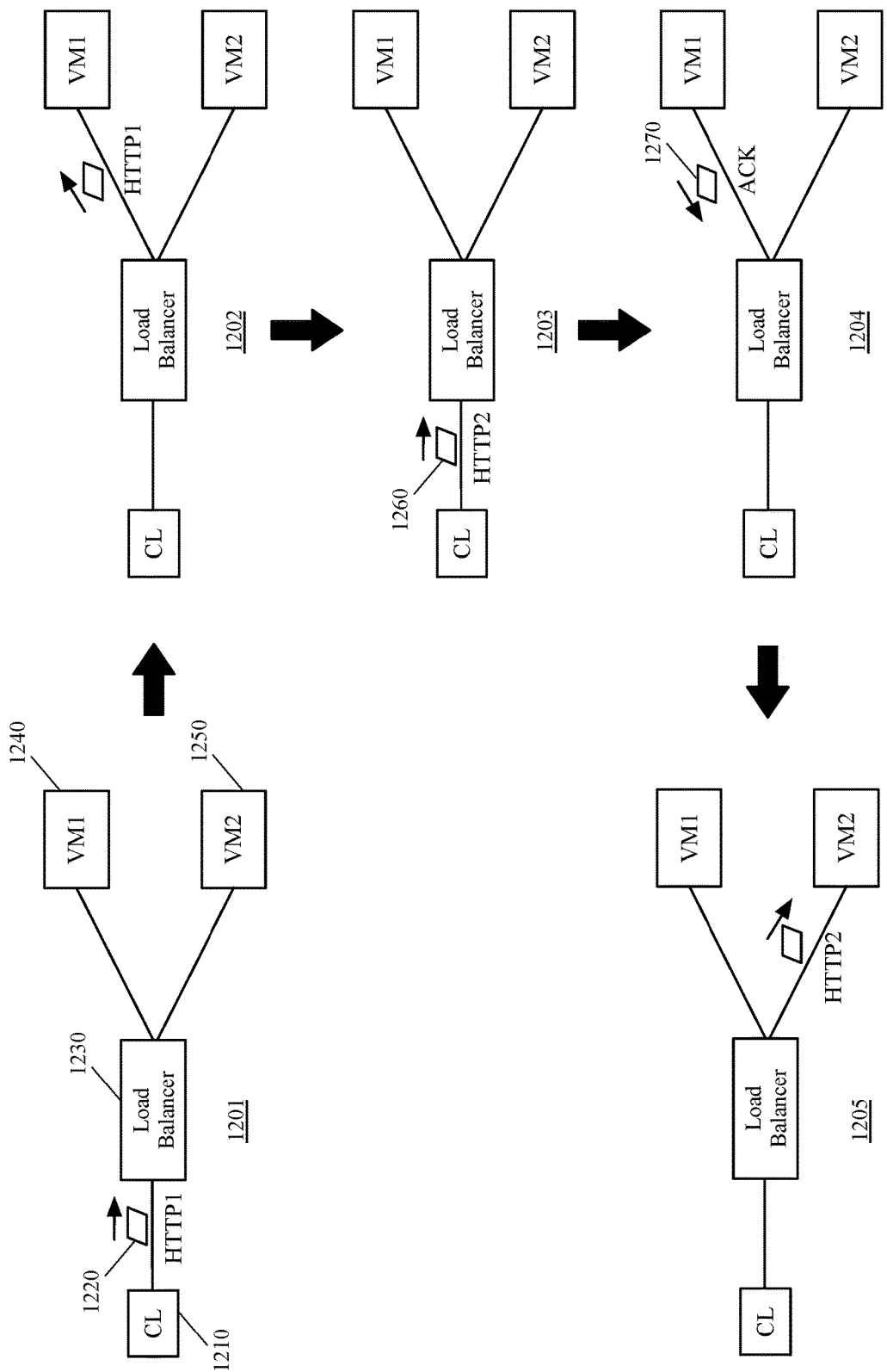
FIG. 12 illustrates an example of exchanging data between a load balancer and a DSHR module of some embodiments when there are multiple HTTP session requests received from a client within a single TCP connection.

FIG. 12 illustrates an example of exchanging data between a load balancer and a DSHR module of some embodiments when there are multiple HTTP session requests received from a client within a single TCP connection. Specifically, this figure shows, through five different stages 1201-1205, two different HTTP session requests for a same TCP connection being sent to two different servers. The figure includes a client machine 1210, a load balancer 1230, and two VMs 1240-1250.

The first stage 1201 shows that the client machine sends an HTTP request 1220 towards the load balancer 1230. In some embodiments, the HTTP request is sent after a TCP connection has already been established between the client machine 1210 and the virtual server 1240. The load balancer can be a physical L7 load balancer or a logical load balancer that is implemented on an edge node (gateway machine) of a datacenter. A corresponding L7 DSHR module that is implemented on a hypervisor of a host machine of the datacenter and that is cable of handling particular services that a layer 7 load balancer provides, is not shown in the figure for simplicity of description.

The second stage 1202 illustrates that the load balancer 1230 is sending the request towards VM 1240. This is because the load balancer, after receiving the request, realizes that there is no other active HTTP session between the client and any of the servers. As such, the load balancer 1230 sends the request (and corresponding HTTP session data) to an L7 DSHR module of the hypervisor of the host machine that hosts VM 1240. The DSHR module, after receiving the request, updates its database, removes any extra connection state data from the packet headers, and makes any necessary adjustments to the variables of the connections (e.g., both TCP and HTTP). The DSHR module then sends the packet to VM 1240.

The third stage 1203 shows that the client machine is sending another HTTP request 1260 towards the load balancer 1230. The load balancer receives this request while the first HTTP connection is still active and no acknowledgment (i.e., end of return traffic transmission) has been received from the server that has the live session (i.e., virtual server 1240). As such, the load balancer only queues the request.

The fourth stage 1204 shows that the server 1240 is sending an acknowledgement 1270 towards the load balancer 1230. This acknowledgement tells the load balancer that the transmission of the requested data (requested by the client 1210) is completed. In some embodiments, the server does not send such an acknowledgement. Instead, the DSHR module that is associated with the server sends the acknowledgement when it receives the last packet of the data flow. In some embodiments, in addition to the acknowledgement, the DSHR module sends the latest TCP connection state data to the load balancer to be used for the next HTTP connection. In some other embodiments, the DSHR module sends the state data only when the next connection has to happen with a different hypervisor.

The fifth stage 1205 illustrates that after the load balancer 1230 realizes that there is no other active HTTP connection, the load balancer sends the queued HTTP request 1260 towards the second server 1250. In some embodiments, the load balancer first sends the TCP connection data that was handed off to the load balancer by the last DSHR module, to the new DSHR module. The new DSHR module, after receiving the connection data, establishes a TCP connection with the client (as described above by reference to FIG. 10) and after this connection is established, the DSHR module receives the new HTTP request 1260 from the load balancer 1230.

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 13:
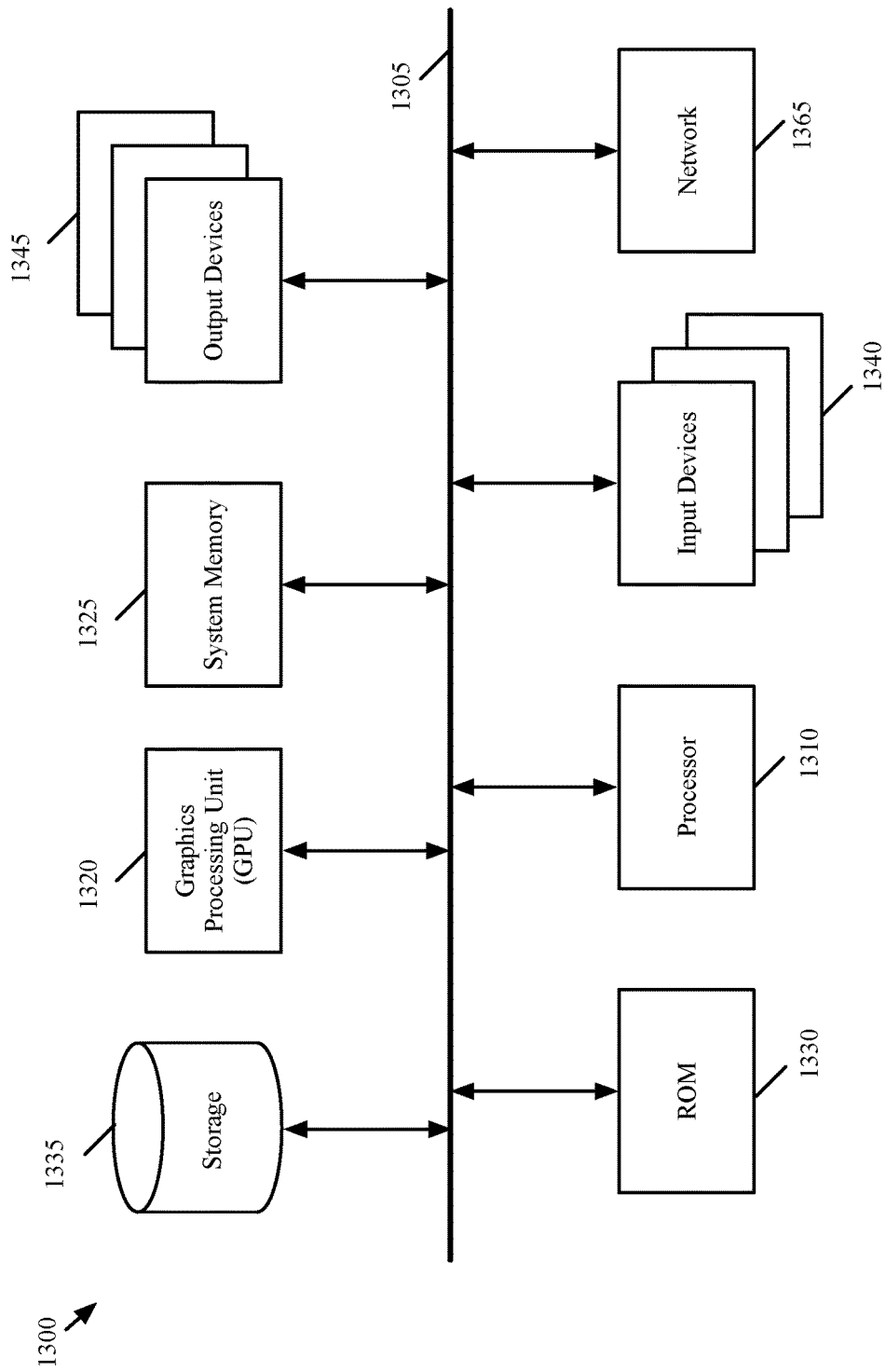
FIG. 13 conceptually illustrates an electronic system with which some embodiments of the invention are implemented.

FIG. 13 conceptually illustrates an electronic system 1300 with which some embodiments of the invention are implemented. The electronic system 1300 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 1300 includes a bus 1305, processing unit(s) 1310, a system memory 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1330, the system memory 1325, and the permanent storage device 1335.

From these various memory units, the processing unit(s) 1310 retrieves instructions to execute and data to process in order to execute the processes of the invention. The processing unit(s) may be a single processor or a multi-core processor in different embodiments.

The read-only-memory (ROM) 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive) as the permanent storage device 1335.

Other embodiments use a removable storage device (such as a floppy disk, flash memory device, etc., and its corresponding drive) as the permanent storage device. Like the permanent storage device 1335, the system memory 1325 is a read-and-write memory device. However, unlike storage device 1335, the system memory 1325 is a volatile read-and-write memory, such a random access memory. The system memory 1325 stores some of the instructions and data that the processor needs at runtime. In some embodiments, the invention's processes are stored in the system memory 1325, the permanent storage device 1335, and/or the read-only memory 1330. From these various memory units, the processing unit(s) 1310 retrieves instructions to execute and data to process in order to execute the processes of some embodiments.

The bus 1305 also connects to the input and output devices 1340 and 1345. The input devices 1340 enable the user to communicate information and select commands to the electronic system. The input devices 1340 include alphanumeric keyboards and pointing devices (also called "cursor control devices"), cameras (e.g., webcams), microphones or similar devices for receiving voice commands, etc. The output devices 1345 display images generated by the electronic system or otherwise output data. The output devices 1345 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 13, bus 1305 also couples electronic system 1300 to a network 1365 through a network adapter (not shown). In this manner, the computer can be a part of a network of computers (such as a local area network ("LAN"), a wide area network ("WAN"), or an Intranet, or a network of networks, such as the Internet. Any or all components of electronic system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

Additionally, the term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. In addition, a number of the figures (including FIGS. 3, 4, 6, and 9-11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for forwarding load balanced network traffic, the method comprising:

at a host computer executing a data compute node (DCN),
receiving, from a load balancer, a first data message that has (i) a first address associated with the DCN as a destination address and (ii) a source address identifying a source of the first data message;
identifying a second address embedded in the first data message by the load balancer, the second address originally specified as the destination address in a header of the first data message before being replaced with the first address in a load balancing operation of the load balancer;
based on (i) the source address and the first address of the first data message and (ii) the second address embedded in the first data message, generating a table entry to use subsequently to replace, with the second address, the first address that is specified as a source address of a subsequent data message sent by the DCN to the source of the first data message; and
forwarding the first data message towards the DCN.

2. The method of claim 1 further comprising storing the generated table entry with the second address in a local data storage of the host computer.

3. The method of claim 2 further comprising, prior to generating the table entry, determining that no table entry associated with the first data message exists in the local data storage.

4. The method of claim 1, wherein
the DCN is one particular DCN in a group of DCNs that all perform a common operation, and
the first address is an internet protocol (IP) address of the DCN and the second address is a virtual IP address of the group of DCNs.

5. The method of claim 1, wherein the source of the first data message is a client requesting data from a DCN in the group of DCNs.

6. The method of claim 5 further comprising forwarding the second data message towards the client via a path that bypasses the load balancer.

7. The method of claim 1, wherein the table entry identifies a data flow based on the source and destination addresses of the first data message, by assigning the second address of the first data message as a source address of a reverse flow and assigning the source address of the first data message as a destination address of the reverse flow.

8. The method of claim 7 further comprising generating a second table entry for the data flow of the first data message using the source and destination addresses of the first data message.

9. The method of claim 1, wherein identifying the second address comprises retrieving a set of values embedded in a particular header field of the first data message and matching the set of retrieved values to an entry in a mapping table, the entry further mapping the set of retrieved values to the second address.

10. The method of claim 1, wherein the DCN comprises a virtual server of a set of virtual servers that implements a distributed application, wherein the first data message is for requesting data from the distributed application.

11. A non-transitory machine readable medium storing a program which when executed by at a set of processing units of a host computer forwards load balanced network traffic, the processing units of the host computer further executing a data compute node (DCN), the program comprising sets of instructions for:

receiving, from a load balancer, a first data message that has (i) a first address associated with the DCN as a destination address and (ii) a source address identifying a source of the first data message;
identifying a second address embedded in the first data message by the load balancer, the second address originally specified as the destination address in a header of the first data message before being replaced with the first address in a load balancing operation of the load balancer;
based on (i) the source address and the first address of the first data message and (ii) the second address embedded in the first data message, generating a table entry to use subsequently to replace with the second address, the first address that is specified as a source address of a subsequent data message sent by the DCN to the source of the first data message; and
forwarding the first data message towards the DCN.

12. The non-transitory machine readable medium of claim 11, wherein
the DCN is one particular DCN in a group of DCNs that all perform a common operation, and
the first address is an internet protocol (IP) address of the DCN and the second address is a virtual IP address of the group of DCNs.

13. The non-transitory machine readable medium of claim 11, wherein the source of the first data message is a client requesting data from a DCN in the group of DCNs.

14. The non-transitory machine readable medium of claim 13, wherein the program further comprises a set of instructions for forwarding the second data message towards the client via a path that bypasses the load balancer.

15. The non-transitory machine readable medium of claim 11, wherein the DCN is a particular virtual server in a set of virtual servers that implement a distributed application and the first address is a network address of the particular virtual server.

16. The non-transitory machine readable medium of claim 15, wherein the second address is a virtual internet protocol (VIP) address associated with the distributed application.

17. The non-transitory machine readable medium of claim 16, wherein the load balancer selects the particular virtual server over other virtual servers in the set based on a load balancing algorithm.

* * * * *